United States Patent
Seo et al.

(10) Patent No.: US 9,490,951 B2
(45) Date of Patent: Nov. 8, 2016

(54) METHOD AND DEVICE FOR SETTING A CONTROL CHANNEL AND A DATA CHANNEL IN A WIRELESS COMMUNICATION SYSTEM

(75) Inventors: Dong Youn Seo, Anyang-si (KR); Joon Kui Ahn, Anyang-si (KR); Suck Chel Yang, Anyang-si (KR); Han Byul Seo, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 253 days.

(21) Appl. No.: 14/131,871

(22) PCT Filed: Jul. 13, 2012

(86) PCT No.: PCT/KR2012/005625
§ 371 (c)(1),
(2), (4) Date: Jan. 9, 2014

(87) PCT Pub. No.: WO2013/009145
PCT Pub. Date: Jan. 17, 2013

(65) Prior Publication Data
US 2014/0153539 A1   Jun. 5, 2014

Related U.S. Application Data

(60) Provisional application No. 61/508,019, filed on Jul. 14, 2011, provisional application No. 61/538,119, filed on Sep. 22, 2011, provisional application No. 61/554,965, filed on Nov. 2, 2011.

(51) Int. Cl.
*H04W 4/00* (2009.01)
*H04L 5/00* (2006.01)
*H04L 27/26* (2006.01)

(52) U.S. Cl.
CPC ............. *H04L 5/0053* (2013.01); *H04L 5/001* (2013.01); *H04L 5/0044* (2013.01); *H04L 5/0091* (2013.01); *H04L 27/2601* (2013.01); *H04L 5/0051* (2013.01); *H04L 5/0064* (2013.01)

(58) Field of Classification Search
USPC .................. 370/329, 330, 331, 338
See application file for complete search history.

(56) References Cited

U.S. PATENT DOCUMENTS

| | | | |
|---|---|---|---|
| 2010/0165847 A1 | 7/2010 | Kamuf et al. | |
| 2011/0170496 A1* | 7/2011 | Fong | H04L 5/0053 370/329 |
| 2013/0003672 A1* | 1/2013 | Dinan | H04L 1/00 370/329 |

FOREIGN PATENT DOCUMENTS

| | | |
|---|---|---|
| CN | 102026393 | 4/2011 |
| CN | 102036297 | 4/2011 |

(Continued)

OTHER PUBLICATIONS

LG Electronics Inc., "PDSCH Starting Symbol Indication for Cross-Carrier Scheduling," TSG-RAN WG1 Meeting #61, R1-102707, May 2010, XP050419910, 3 pages.

(Continued)

*Primary Examiner* — Zewdu A Beyen
(74) *Attorney, Agent, or Firm* — Lee, Hong, Degerman, Kang & Walmey; Jonathan Kang; Michael Monaco

(57) ABSTRACT

The present invention relates to a method for configuring a starting position of a control channel in a wireless communication system, and a terminal using the same. The method includes receiving duration information about a physical downlink control channel from the first orthogonal frequency division multiplexing (OFDM) symbol of a downlink subframe; and configuring a first OFDM symbol after OFDM symbols indicated by the duration information, as a starting point of an enhanced-physical downlink control channel. The downlink subframe includes a plurality of subcarriers in a frequency domain and 12 or 14 OFDM symbols in a time domain. The PDCCH includes the first N (N is a natural number of from 1 to 4) number of OFDM symbols of the downlink subframe. The duration information indicates the N number of OFDM symbols. The E-PDCCH comprises the starting point to the last OFDM symbol of the downlink subframe.

8 Claims, 17 Drawing Sheets

(56) References Cited

FOREIGN PATENT DOCUMENTS

| KR | 10-2009-0083269 | 8/2009 |
|---|---|---|
| KR | 10-2011-0020732 | 3/2011 |
| WO | 2010/053984 | 5/2010 |
| WO | 2011/000440 | 1/2011 |
| WO | 2011/002218 | 1/2011 |

OTHER PUBLICATIONS

3rd Generation Partnership Project (3GPP), "Technical Specification Group Radio Access Network; Evolved Universal Terrestrial Radio Access (E-UTRA); Physical Layer Procedures (Release 10)," 3GPP TS 36.213 V10.0.1, Dec. 2010, XP050462385, 98 pages.
3rd Generation Partnership Project (3GPP), "Technical Specification Group Radio Access Network; Evolved Universal Terrestrial Radio Access (E-UTRA); Physical Channels and Modulation (Release 8)," 3GPP TS 36.211 V8.5.0, Dec. 2008, XP050377537, 82 pages.
European Patent Office Application Serial No. 12811942.7, Search Report dated Feb. 10, 2015, 8 pages.
Zte, "Aspects on DL control signaling enhancements," TSG-RAN WG1 #65, R1-111521, May 2011, 7 pages.
Panasonic, "Considerations on PDCCH Enhancements for Release 11," 3GPP TSG RAN WG1 Meeting #65, R1-111589, May 2011, 2 pages.
Research in Motion, UK Limited, "PDCCH Enhancement Considerations," 3GPP TSG RAN WG1 Meeting #65, R1-111661, May 2011, 4 pages.
The State Intellectual Property Office of the People's Republic of China Application Serial No. 201280034996.7, Office Action dated Jan. 6, 2016, 10 pages.
LG Electronics Inc., "PDSCH Starting Symbol Indication in Cross-Carrier Scheduling", TSG-RAN WG1 Meeting #60bis, R1-102364, Apr. 6, 2010, 4 pages.

\* cited by examiner

FIG. 8
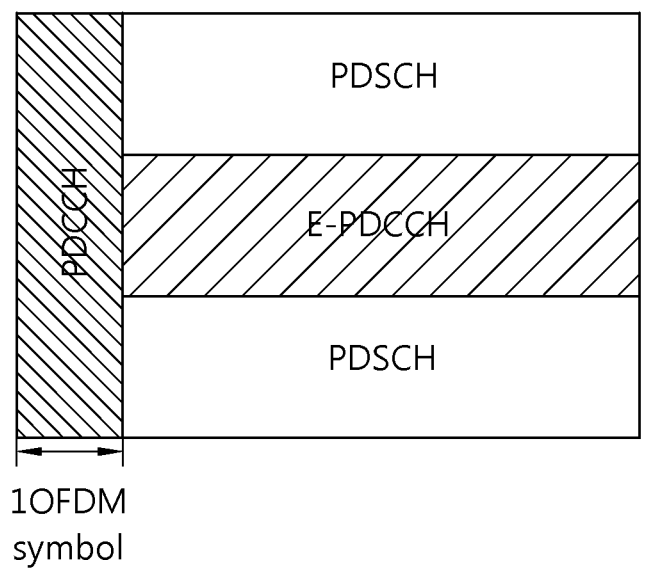
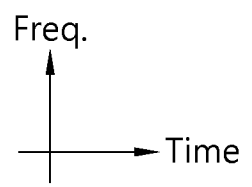

FIG. 15
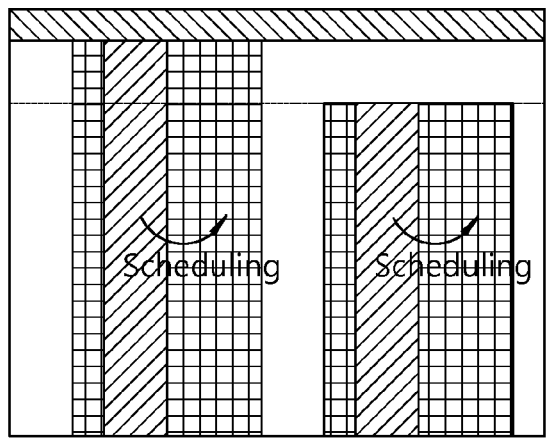
Start position of E-PDCCH in cell
in which scheduled PDSCH is placed
is the same as that of PDSCH
<Non-cross carrier scheduling>
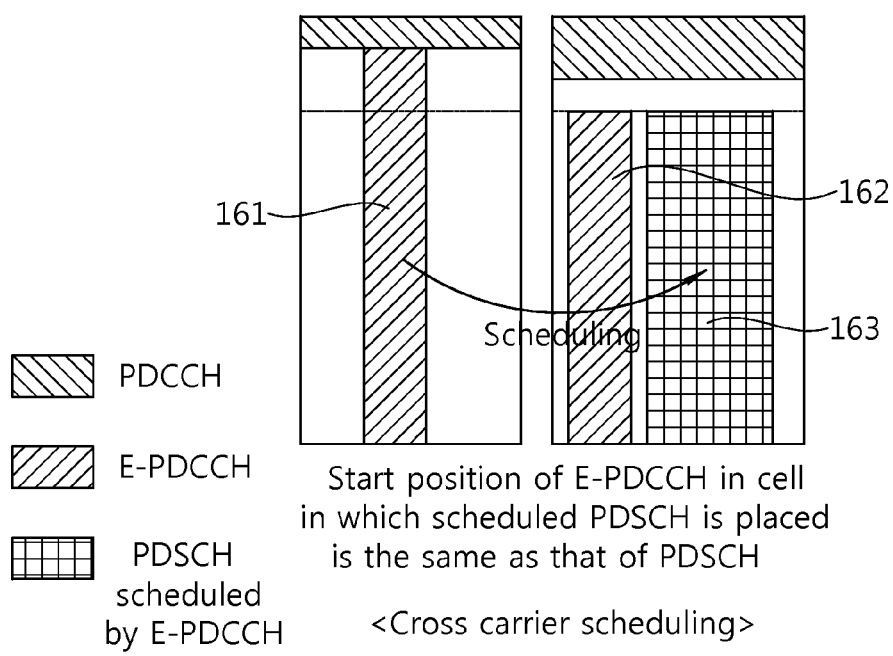
Start position of E-PDCCH in cell
in which scheduled PDSCH is placed
is the same as that of PDSCH
<Cross carrier scheduling>
- PDCCH
- E-PDCCH
- PDSCH scheduled by E-PDCCH

FIG. 16
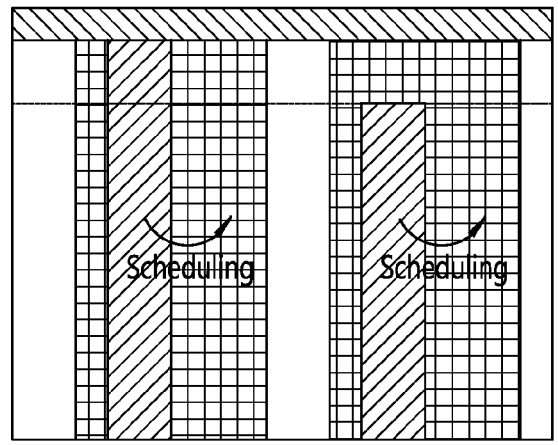
Start position of PDSCH
1. Right after PDCCH
2. Determined by PCFICH
3. Determined by E-PDCCH
<Non-cross carrier scheduling>
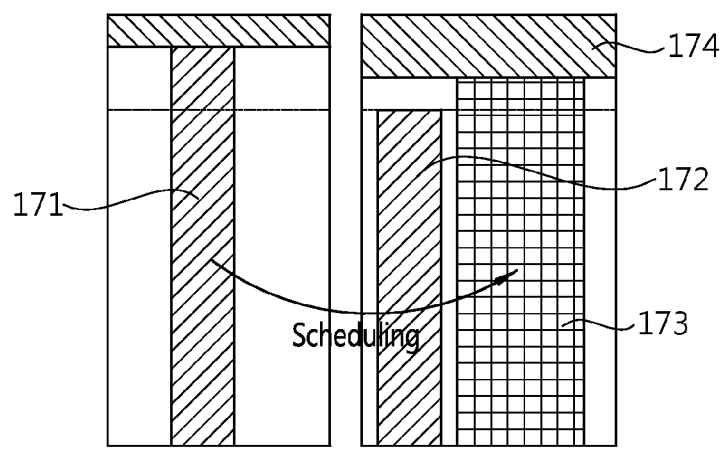
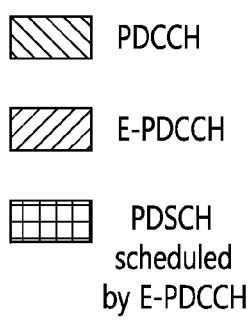
- PDCCH
- E-PDCCH
- PDSCH scheduled by E-PDCCH
Start position of PDSCH
1. Right after PDCCH
2. Determined by PCFICH in cell in which PDSCH is placed
3. Determined by scheduling E-PDCCH
<Cross carrier scheduling>

METHOD AND DEVICE FOR SETTING A CONTROL CHANNEL AND A DATA CHANNEL IN A WIRELESS COMMUNICATION SYSTEM

CROSS-REFERENCE TO RELATED APPLICATIONS

This application is the National Stage filing under 35 U.S.C. 371 of International Application No. PCT/KR2012/005625, filed on Jul. 13, 2012, which claims the benefit of U.S. Provisional Application Ser. No. 61/508,019, filed on Jul. 14, 2011, 61/538,119, filed on Sep. 22, 2011, and 61/554,965, filed on Nov. 2, 2011, the contents of which are all hereby incorporated by reference herein in their entirety.

BACKGROUND OF THE INVENTION

1. Field of the Invention

The present invention relates to wireless communication and, more particularly, to a method and apparatus for configuring a control channel and a data channel in a wireless communication system.

2. Related Art

One of the most important requirements of the next-generation wireless communication system is to be able to support a high data transfer rate. To this end, various techniques, such as Multiple Input Multiple Output (MIMO), Cooperative Multiple Point (CoMP) transmission, and a relay, are being researched, but the most basic and stable solution is to increase the bandwidth.

However, frequency resources are now in the saturation state, and various techniques are partially being used in a wide range of frequency bands. For this reason, as a scheme for securing a wide bandwidth in order to satisfy the requirements of a higher data transfer rate, a Carrier Aggregation (CA) that is a concept in which each of scattered bands is designed to satisfy the basic requirements in which each band can operate as an independent system and a number of bands are aggregated into one system is being introduced. Here, a band or carrier capable of independently operating is defined as a Component Carrier (CC).

In a recent communication standard, for example, in a standard, such as 3GPP LTE-A or 802.16m, the continuous extension of the band up to a 20 MHz or more is being taken into consideration. In this case, a broadband is supported by aggregating one or more CCs. For example, if one CC corresponds to a bandwidth of 5 MHz, a bandwidth of a maximum of 20 MHz is supported by aggregating 4 carriers. A system that supports a CA as described above is called a carrier aggregation system.

Meanwhile, in a wireless communication system, a system in which one base station supports terminals more than terminals supported by an existing system is taken into consideration. For example, one base station may support more terminals due to the application of techniques, such as Machine Type Communication (MTC) and enhanced multi-user Multi-Input Multi-Output (MIMO).

In such a case, it may be difficult to send control information to a plurality of terminals using only a conventional control channel or radio resource region in which control information is transmitted. In order to solve such a problem, the assignment of a new control channel to a data channel or a radio resource region in which data is transmitted in a conventional system is being taken into consideration.

If a new control channel is assigned in a wireless communication system capable of supporting a CA, how a terminal will be informed of the position where the new control channel has been assigned using what method is problematic. Furthermore, if a new control channel is included in an existing data channel, how the position of the data channel will be configured using what method is problematic.

SUMMARY OF THE INVENTION

There are provided a method of configuring a control channel and a data channel in a wireless communication system and an apparatus using the method.

In an aspect, a method of setting the start position of a control channel in a time domain in a wireless communication system, including steps of receiving duration information indicating the duration of a Physical Downlink Control CHannel (PDCCH) in the first Orthogonal Frequency Division Multiplexing (OFDM) symbol of a downlink subframe and setting a first OFDM symbol after OFDM symbols indicated by the duration information as the start point of an Enhanced-Physical Downlink Control CHannel (E-PDCCH), wherein the downlink subframe includes a plurality of subcarriers in a frequency domain and includes 12 to 14 OFDM symbols in the time domain, the PDCCH includes first N (N is a natural number of any one of 1 to 4) OFDM symbols of the downlink subframe, the duration information indicates the N OFDM symbols, and the E-PDCCH includes the start point to the last OFDM symbol of the downlink subframe.

The E-PDCCH may be assigned to user equipment for which a search space has been configured in the OFDM symbols indicated by the duration information in a cell in which the E-PDCCH is placed, and the search space is a resource region in which the user equipment searches for a PDCCH assigned to the user equipment.

The E-PDCCH may be placed in a primary cell in which user equipment performs first access or re-access on a base station.

In another aspect, a method of setting the start position of a control channel in a time domain in a wireless communication system, including steps of receiving duration information indicating the duration of a Physical Downlink Control CHannel (PDCCH) in the first Orthogonal Frequency Division Multiplexing (OFDM) symbol of a downlink subframe; receiving start position information indicating the start position of an Enhanced-Physical Downlink Control CHannel (E-PDCCH) in an $M^{th}$ OFDM symbol of the downlink subframe; and setting the start point of the E-PDCCH based on the start position information about the start position of the E-PDCCH, wherein the downlink subframe includes a plurality of subcarriers in a frequency domain and includes 12 to 14 OFDM symbols in the time domain, and the $M^{th}$ OFDM symbol is an OFDM symbol at the position right after a maximum of OFDM symbols to which the PDCCH is capable of being assigned.

A resource region to which the E-PDCCH is assigned may include a common search space in which all pieces of user equipment within a cell search for respective pieces of control information.

The E-PDCCH may be placed in a primary cell in which user equipment performs first access or re-access on a base station.

If the PDCCH is capable of being assigned to a maximum of 3 OFDM symbols, the $M^{th}$ OFDM symbol may be the fourth OFDM symbol of the downlink subframe.

If the E-PDCCH is placed in the first cell and a data channel scheduled by the E-PDCCH is also placed in the first cell, the start position of the data channel may be the same as the start position of the E-PDCCH placed in the first cell.

If the E-PDCCH is placed in the first cell and a data channel scheduled by the E-PDCCH is placed in a second cell, the start position of the data channel may be the same as the start position of the E-PDCCH placed in the second cell.

In yet another aspect, a method of setting the start position of a control channel in a time domain in a wireless communication system, including steps of receiving duration information indicating the duration of a Physical Downlink Control CHannel (PDCCH) in the first Orthogonal Frequency Division Multiplexing (OFDM) symbol of a downlink subframe; receiving the PDCCH in OFDM symbols indicated by the duration information; and setting a predetermined OFDM symbol after OFDM symbols to which the PDCCH has been assigned as the start point of the E-PDCCH, wherein the downlink subframe includes a plurality of subcarriers in a frequency domain and includes 12 to 14 OFDM symbols in the time domain, and the predetermined OFDM symbol is an OFDM symbol at the position right after a maximum of OFDM symbols to which the PDCCH is capable of being assigned.

The E-PDCCH may be placed in a secondary cell that is a cell other than a primary cell in which user equipment performs first access or re-access on a base station.

If the E-PDCCH is placed in the first cell and a data channel scheduled by the E-PDCCH is also placed in the first cell, the start position of the data channel may be the same as the start position of the E-PDCCH placed in the first cell.

If the E-PDCCH is placed in the first cell and a data channel scheduled by the E-PDCCH is placed in a second cell, the start position of the data channel may be the same as the start position of the E-PDCCH placed in the second cell.

In yet another aspect, a method of setting the start position of a data channel in a time domain in a wireless communication system, including steps of receiving an Enhanced-Physical Downlink Control CHannel (E-PDCCH) and receiving a Physical Downlink Shared CHannel (PDSCH) scheduled by the E-PDCCH, wherein the E-PDCCH is a control channel assigned to a resource region after a Physical Downlink Control Channel (PDCCH) region including first N (N is a natural number of any one of 1 to 4) OFDM symbols in a downlink subframe including a plurality of subcarriers in a frequency domain and including 12 to 14 OFDM symbols in the time domain, and the start position of the PDSCH is determined depending on whether or not the PDSCH is placed in a cell identical with a cell in which the E-PDCCH is placed.

If the E-PDCCH is placed in the first cell and the PDSCH is also placed in the first cell, the start position of the PDSCH may be the same as the start position of the E-PDCCH placed in the first cell.

If the E-PDCCH is placed in the first cell and the PDSCH is placed in a second cell, the start position of the PDSCH may be the same as the start position of the E-PDCCH placed in the second cell.

In yet another aspect, there is provided user equipment. The user equipment includes a Radio Frequency (RF) unit transmitting and receiving radio signals and a processor coupled to the RF unit, wherein the processor receives duration information indicating the duration of a Physical Downlink Control CHannel (PDCCH) in the first Orthogonal Frequency Division Multiplexing (OFDM) symbol of a downlink subframe, receives start position information indicating the start position of an Enhanced-Physical Downlink Control Channel (E-PDCCH) in an $M^{th}$ OFDM symbol of the downlink subframe, and sets the start point of the E-PDCCH based on the start position information, the downlink subframe includes a plurality of subcarriers in a frequency domain and includes 12 to 14 OFDM symbols in the time domain, and the $M^{th}$ OFDM symbol is an OFDM symbol at the position right after a maximum of OFDM symbols to which the PDCCH is capable of being assigned.

If the PDCCH is capable of being assigned to a maximum of 3 OFDM symbols, the $M^{th}$ OFDM symbol may be the fourth OFDM symbol of the downlink subframe.

If the E-PDCCH is placed in the first cell and a data channel scheduled by the E-PDCCH is also placed in the first cell, the start position of the data channel may be the same as the start position of the E-PDCCH placed in the first cell.

If the E-PDCCH is placed in the first cell and a data channel scheduled by the E-PDCCH is placed in a second cell, the start position of the data channel may be the same as the start position of the E-PDCCH placed in the second cell.

In accordance with the present invention, in a wireless communication system in which an additional control channel is configured in addition to an existing control channel, there are provided methods capable of setting the start positions of the additional control channel and a data channel in a time domain. System efficiency can be improved by selecting an appropriate proper method depending on system conditions and using the selected method.

BRIEF DESCRIPTION OF THE DRAWINGS

FIG. 8 shows an example in which an E-PDCCH region is configured.

FIG. 15 shows an example of a method of setting the start position of a PDSCH scheduled through an E-PDCCH.

FIG. 16 shows another example of a method of setting the start position of a PDSCH scheduled through an E-PDCCH.

DESCRIPTION OF EXEMPLARY EMBODIMENTS

Long Term Evolution (LTE) according to the 3$^{rd}$ Generation Partnership Project (3GPP) standardization organization is part of Evolved-UMTS (E-UMTS) using an Evolved-Universal Terrestrial Radio Access Network (E-UTRAN), and LTE adopts Orthogonal Frequency Division Multiple Access (OFDMA) in downlink and adopts Single Carrier-Frequency Division Multiple Access (SC-FDMA) in uplink. LTE-Advanced (A) is the evolution of LTE. In order to clarify a description hereinafter, 3GPP LTE/LTE-A are chiefly described, but the technical spirit of the present invention is not limited thereto.

A wireless communication system includes at least one Base Station (BS). Each BS provides communication service to a specific geographical area. The geographical area may be divided into a plurality of subareas. In general, a BS refers to a fixed station that communicates with user equipment, and the BS may also be called another term, such as an evolved NodeB (eNB), a Base Transceiver System (BTS), an access point, or an Access Network (AN).

User Equipment (UE) may be fixed or mobile and may also be called another term, such as a Mobile Station (MS), a User Terminal (UT), a Subscriber Station (SS), a wireless device, a Personal Digital Assistant (PDA), a wireless modem, a handheld device, or an Access Terminal (AT).

Hereinafter, downlink (DL) refers to communication from a BS to UE, and uplink (UL) refers to communication from UE to a BS.

A wireless communication system may be a system supporting bidirectional communication. Bidirectional communication can be performed using Time Division Duplex (TDD) mode, Frequency Division Duplex (FDD) mode, etc. In TDD mode, different time resources are used in UL transmission and DL transmission. In FDD mode, different frequency resources are used in UL transmission and DL transmission. A BS and UE can communicate with each other using radio resources called a radio frame.

Figure 1:
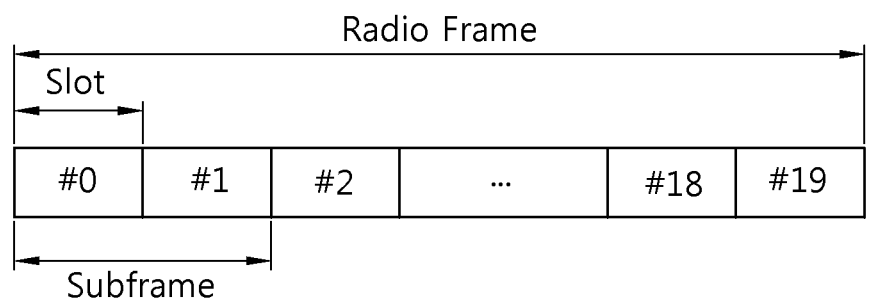
FIG. 1 shows the structure of a radio frame.

FIG. 1 shows the structure of a radio frame.

Referring to FIG. 1, the radio frame (may also be abbreviated as a frame) includes 10 subframes in a time domain, and one subframe includes two slots. The length of one subframe may be 1 ms, and the length of one slot may be 0.5 ms. The time taken to send one subframe is called a Transmission Time Interval (TTI). The TTI may be a minimum unit for scheduling.

One slot may include a plurality of Orthogonal Frequency Division Multiplexing (OFDM) symbols in the time domain. One symbol period is represented by an OFDM symbol because OFDMA is used in downlink in 3GPP LTE. An OFDMA symbol may be called another term depending on a multiple access scheme. For example, if SC-FDMA is used as an uplink multiple access scheme, a corresponding symbol may be called an SC-FDMA symbol. One slot has been illustrated as including 7 OFDM symbols, but the number of OFDM symbols included in one slot may be changed depending on the length of a Cyclic Prefix (CP). In accordance with 3GPP TS 36.211 V8.5.0 (2008-12), 1 subframe includes 7 OFDM symbols in a normal CP, and 1 subframe includes 6 OFDM symbols in an extended CP. The structure of the radio frame is only an example, and the number of subframes included in the radio frame and the number of slots included in a subframe may be changed in various ways.

Figure 2:
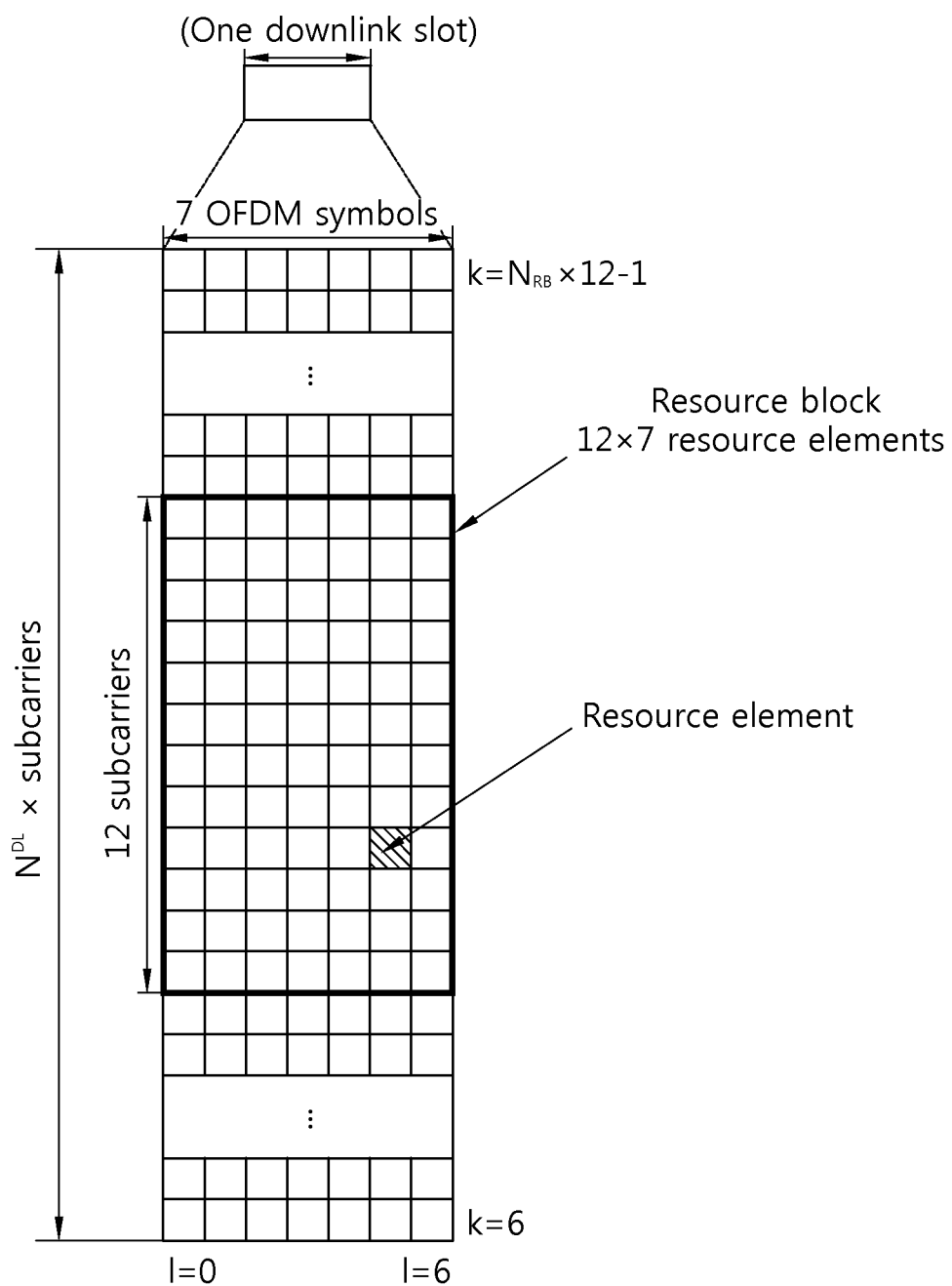
FIG. 2 shows an example of a resource grid for one downlink slot.

FIG. 2 shows an example of a resource grid for one downlink slot.

Referring to FIG. 2, the downlink slot includes a plurality of OFDM symbols in a time domain and includes $N_{RB}$ Resource Blocks (RBs) in a frequency domain. A RB is a resource assignment unit, and the RB includes one slot in the time domain and includes a plurality of consecutive subcarriers in the frequency domain. The number of RBs $N_{RB}$ included in a downlink slot depends on a downlink transmission bandwidth that is configured in a cell. For example, in an LTE system, $N_{RB}$ may be any one of 6 to 110. An uplink slot may have the same structure as the downlink slot.

Each of elements on the resource grid is called a Resource Element (RE). An RE on a resource grid may be identified by an index pair (k, l) within a slot. Here, k (k=0, . . . , $N_{RB} \times 12-1$) indicates a subcarrier index in the frequency domain, and l (l=0, . . . , 6) indicates an OFDM symbol index in the time domain.

In FIG. 2, one RB has been illustrated as including 7×12 REs, including 7 OFDM symbols in the time domain and 12 subcarriers in the frequency domain, but the number of OFDM symbols and the number of subcarriers within an RB are not limited thereto. The number of OFDM symbols and the number of subcarriers may be changed in various ways depending on the length of a CP, frequency spacing, etc. For example, one of 128, 256, 512, 1024, 1536, and 2048 may be selected and used as the number of subcarriers in one OFDM symbol.

Figure 3:
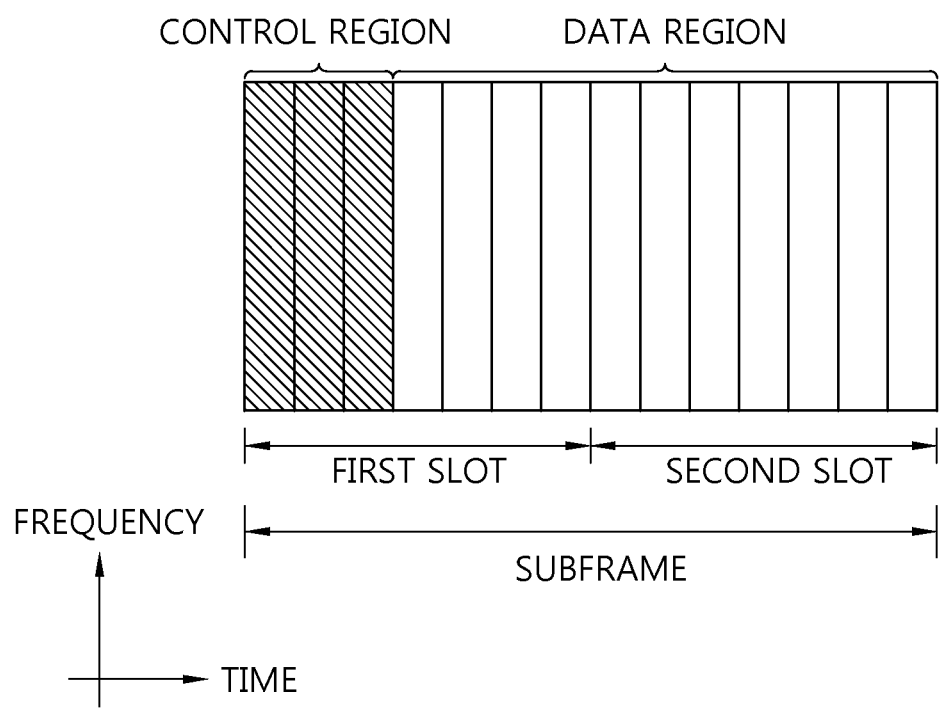
FIG. 3 shows an example of the structure of a conventional downlink subframe.

FIG. 3 shows an example of the structure of a conventional downlink subframe.

The subframe includes two consecutive slots. A maximum of 3 former OFDM symbols in a first slot within the downlink subframe are a control region to which control channels are assigned, and the remaining OFDM symbols are a data region to which data channels are assigned. Here, the control region has been illustrated as including 3 OFDM symbols, but this is only illustrative.

Control channels, such a Physical Downlink Control Channel (PDCCH), a Physical Control Format Indicator Channel (PCFICH), and a Physical Hybrid ARQ Indicator Channel (PHICH), can be assigned to the control region. UE can read data transmitted through a data channel by decoding control information that is transmitted through a PDCCH. A PDCCH is described in detail later. The number of OFDM symbols included in a control region within a subframe can be aware through a PCFICH. A PHICH carries a Hybrid Automatic Repeat Request (HARQ) Acknowledgement (ACK)/NOT-Acknowledgement (NACK) signal in response to UL transmission.

Physical Downlink Shared Channels (PDSCHs) may be assigned to the data region. Hereinafter, the control region may be called a PDCCH region and the data region may be called a PDSCH region, for convenience' sake.

[Structure of a PDCCH]

A control region includes a plurality of Control Channel Elements (CCEs) that is a logical CCE column. A CCE corresponds to a plurality of Resource Element Groups (REGs). For example, a CCE may correspond to 9 REGs. An REG is used to define that a control channel is mapped to an RE. For example, one REG may consist of 4 REs. A CCE column is a total of sets of CCEs that form a control region within one subframe.

A plurality of PDCCHs may be transmitted within a control region. A PDCCH is transmitted on one CCE or an aggregation of several consecutive CCEs. A format of a PDCCH and the number of possible bits of a PDCCH are determined by the number of CCEs that forms a CCE aggregation. The number of CCEs used to send a PDCCH is hereinafter called a CCE aggregation level L. Furthermore, a CCE aggregation level is a CCE unit for searching for a PDCCH. The size of a CCE aggregation level is defined by the number of contiguous CCEs. For example, a CCE aggregation level may be defined by CCEs, such as a number of {1, 2, 4, 8}.

The following table shows an example of the formats of PDCCHs according to CCE aggregation levels and the number of possible bits of the PDCCHs.

TABLE 1

| PDCCH Format | CCE aggregation level | Number of REGs | Number of bits of PDCCH |
|---|---|---|---|
| 0 | 1 | 9 | 72 |
| 1 | 2 | 18 | 144 |
| 2 | 4 | 36 | 288 |
| 3 | 8 | 72 | 576 |

Control information transmitted through a PDCCH is called Downlink Control Information (DCI). UL scheduling information (this is called an UL grant), DL scheduling information (this is called a DL grant), an UL power control command, control information for paging, control information for indicating a random access response (RACH response), etc. are transmitted on DCI.

DCI may be transmitted with a specific format, and the use of DCI may be determined depending on each DCI format. For example, the use of a DCI format may be classified as in the following table.

TABLE 2

| DCI FORMAT | CONTENTS |
|---|---|
| DCI format 0 | Used for PUSCH scheduling |
| DCI format 1 | Used for the scheduling of one PDSCH codeword |
| DCI format 1A | Used for compact scheduling and a random access process for one PDSCH codeword |
| DCI format 1B | Used for the compact scheduling of one PDSCH codeword having precoding information |
| DCI format 1C | Used for the very compact scheduling of one PDSCH codeword |
| DCI format 1D | Used for the precoding and compact scheduling of one PDSCH codeword having power offset information |
| DCI format 2 | Used for the PDSCH scheduling of UEs set in closed-loop spatial multiplexing mode |
| DCI format 2A | Used for the PDSCH scheduling set in open-loop spatial multiplexing mode |
| DCI format 3 | Used to send a TPC command for a PUCCH and a PUSCH having 2-bit power adjustments |
| DCI format 3A | Used to send a TPC command for a PUCCH and a PUSCH having 1-bit power adjustment |
| DCI format 3B | Used to schedule a PUSCH in one UL cell in a multi-antenna transmission mode |

A PDCCH may be generated through the following process. A BS adds a Cyclic Redundancy Check (CRC) for error detection to DCI to be transmitted to UE. An identifier (this is called a Radio Network Temporary Identifier (RNTI)) is masked to the CRC depending on the owner or use of a PDCCH. In the case of a PDCCH for specific UE, an identifier unique to the UE that is assigned by a BS, for example, a Cell-RNTI (C-RNTI) can be masked to a CRC. In the case of a PDCCH for a paging message transmitted through a paging channel (PCH), a paging identifier, for example, a Paging-RNTI (P-RNTI) can be masked to a CRC. In the case of a PDCCH for system information, a system information identifier, for example, a System Information-RNTI (SI-RNTI) can be masked to a CRC. In the case of a PDCCH for indicating a random access response, that is, a response to the transmission of a random access preamble by UE, a Random Access-RNTI (RA-RNTI) can be masked to a CRC. If a C-RNTI is used, a PDCCH carries control information for corresponding specific UE. If an RNTI is used, a PDCCH carries common control information received by all pieces of UE within a cell.

Thereafter, coded data is generated by performing channel coding on control information to which a CRC has been added. Next, rate matching according to a CCE aggregation level that has been assigned to a PDCCH format is performed. Next, modulation symbols are generated by modulating the coded data. The number of modulation symbols that form one CCE may vary depending on a CCE aggregation level (one of 1, 2, 4, and 8). The modulation symbols are mapped (CCE to RE mapped) to a physical RE.

In 3GPP LTE, UE uses blind decoding in order to detect a PDCCH. Blind decoding is a method of checking whether or not a corresponding PDCCH is for its control channel by checking an CRC error by demasking a desired identifier from the Cyclic Redundancy Check (CRC) of a received PDCCH (this is called a PDCCH candidate). The reason why UE performs blind decoding is that the UE is unaware that its own PDCCH is transmitted at which position within a control region using what CCE aggregation level or DCI format.

As described above, a plurality of PDCCHs can be transmitted within one subframe, and UE monitors a plurality of PDCCHs every subframe. Here, 'monitoring' means that UE attempts to decode a PDCCH depending on a PDCCH format.

In 3GPP LTE, a Search Space (SS) is used in order to reduce overhead attributable to blind decoding. A search space can be said to be a monitoring set of CCEs for a PDCCH. UE monitors a PDCCH within a corresponding search space.

A search space is divided into a Common Search Space (CSS) and a UE-specific Search Space (USS). A CSS is a space where a PDCCH having common control information is searched for. A CSS may include 16 CCEs having CCE indices 0~15 and supports a PDCCH having a CCE aggregation level of {4, 8}. All pieces of UE within a cell are informed of a CSS, and UE searches for DCI formats 1A, 1C, 3, and 3A in a CSS. A PDCCH on which UE-specific information is carried may be transmitted in a CSS.

A USS is configured each piece of UE, and the USS supports a PDCCH having a CCE aggregation level of {1, 2, 4, 8}. UE is not required to search for all defined DCI formats at the same time. This is for reducing the number of times that blind decoding is attempted. UE always searches a USS for DCI formats 0 and 1A which have the same length and are classified by a 1-bit flag. UE additionally searches for DCI formats 1, 1B, and 2 depending on a transmission mode. Transmission mode is described later.

The size of the search space is differently defined in a CSS and a USS. The start point of a CSS is fixed irrespective of a subframe, whereas the start point of a USS can vary every subframe depending on a UE identifier (e.g., C-RNTI), a CCE aggregation level and/or a slot number within a radio frame. If the start point of a USS is within a CSS, the USS and the CSS may overlap with each other.

In a CCE aggregation level L∈{1,2,3,4}, a search space $S^{(L)}_k$ can be defined by a set of candidate PDCCHs. A CCE corresponding to a candidate PDCCH m of the search space $S^{(L)}_k$ is given as follows.

$$L \cdot \{(Y_k+m) \bmod \lfloor N_{CCE,k}/L \rfloor\} + i \quad \text{[Equation 1]}$$

In Equation 1, i=0, 1, . . . , L−1, m=0, . . . , $M^{(L)}$−1, and $N_{CCE,k}$ is a total number of CCEs that may be used to send a PDCCH within the control region of a subframe k. The control region includes a set of CCEs that are numbered from 0 to $N_{CCE,k}$−1. $M^{(L)}$ is the number of candidate PDCCHs in a CCE aggregation level L in a given search space. In a CSS, $Y_k$ is set to 0 in relation to 2 aggregation levels, that is, L=4 and L=8. In the USS of a CCE aggregation level L, the parameter $Y_k$ is defined as follows.

$$Y_k = (A \cdot Y_{k-1}) \bmod D \quad \text{[Equation 2]}$$

In Equation 2, $Y_{-1} = n_{RNTI} \neq 0$, A=39827, D=65537, k=floor ($n_s/2$), and $n_s$ is a slot number within a radio frame.

The following table indicates the number of candidate PDCCHs in a search space.

TABLE 3

| PDCCH Format | Number of CCEs | Number of candidate PDCCHs in CSS | Number of candidate PDCCHs in USS |
|---|---|---|---|
| 0 | 1 | — | 6 |
| 1 | 2 | — | 6 |
| 2 | 4 | 4 | 2 |
| 3 | 8 | 2 | 2 |

Meanwhile, a transmission mode for DL may be classified into the following 9 types between a BS and UE. The number of codewords or transport blocks included in a PDSCH within each subframe may vary depending on a transmission mode for DL.

Transmission mode 1: mode in which precoding is not performed (single antenna port transmission mode), Transmission mode 2: transmission mode that may be used in 2 or 4 antenna ports using Space-Frequency Block Coding (SFBC) (transmission diversity).

Transmission mode 3: open-loop mode that allows rank adaptation based on Rank Indication (RI) feedback (open-loop space multiplexed). If a rank is 1, transmission diversity may be applied. If a rank is greater than 1, large delay Cyclic Delay Diversity (CDD) may be used.

Transmission mode 4: mode to which precoding feedback that supports dynamic rank adaptation is applied (closed-loop space multiplexed).

Transmission mode 5: multi-user MIMO

Transmission mode 6: closed-loop rank 1 precoding

Transmission mode 7: transmission mode in which a UE-specific reference signal is used.

Transmission mode 8: dual layer transmission using antenna ports 7 and 8 or single antenna port transmission using an antenna port 7 or an antenna port 8 (dual layer transmission).

Transmission mode 9: transmission of a maximum of 8 layers using antenna ports 7 to 14.

Figure 4:
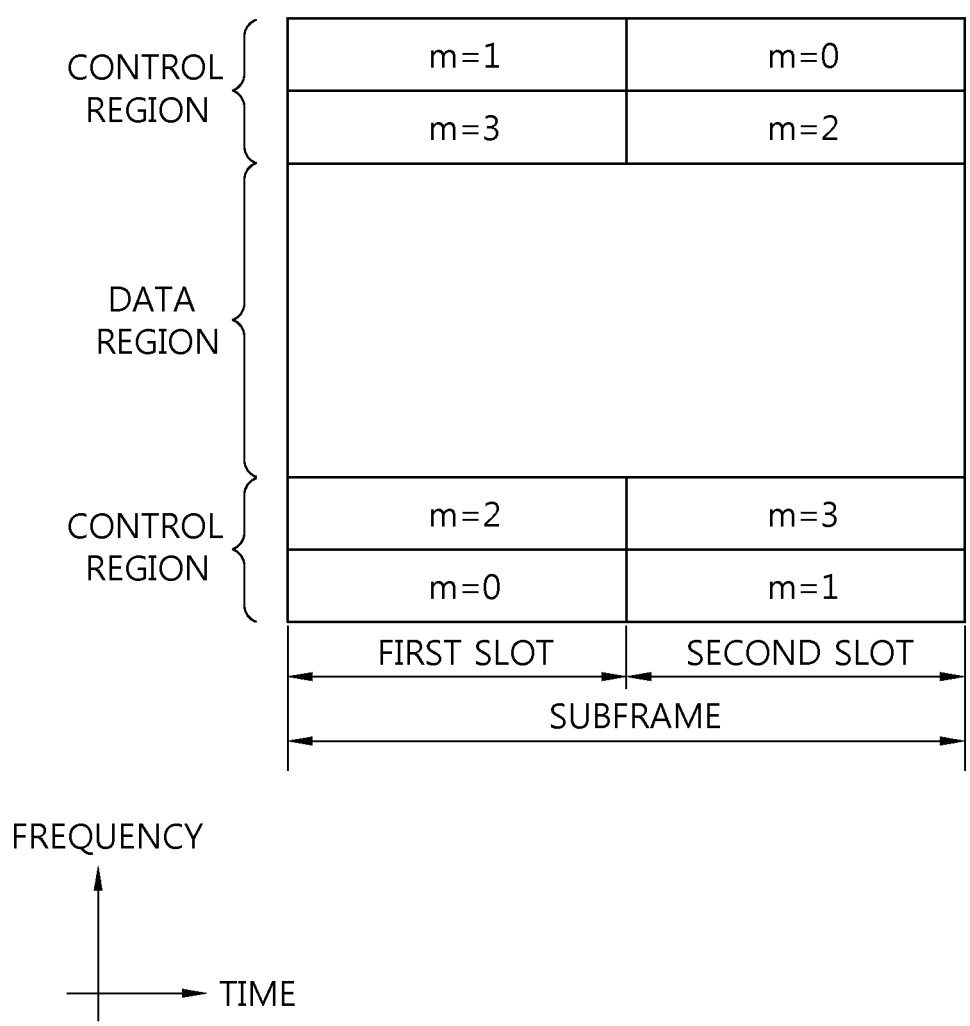
FIG. 4 shows the structure of an uplink subframe.

FIG. 4 shows the structure of an uplink subframe.

Referring to FIG. 4, the uplink subframe can be divided into a control region and a data region in a frequency domain. A physical uplink control channel (PUCCH) on which uplink control information is transmitted is assigned to the control region. A physical uplink shared channel (PUSCH) on which data (control information may also be transmitted according to circumstances) is transmitted is assigned to the data region. UE may transmit a PUCCH and a PUSCH at the same time or may transmit only one of a PUCCH and a PUSCH depending on a configuration.

A PUCCH for UE is assigned in the form of a RB pair (RB pair) in the subframe. Resource blocks that belong to the RB pair occupy different subcarriers in a first slot and a second slot. A frequency that is occupied by the RBs belonging to the RB pair to which a PUCCH is assigned is changed on the basis of a slot boundary. This is said that the RB pair assigned to the PUCCH has been subjected to frequency-hopped at the slot boundary. A frequency diversity gain can be obtained by sending uplink control information through different subcarriers over time.

Hybrid Automatic Repeat reQuest (HARQ) acknowledgement (ACK)/non-acknowledgement (NACK), and Channel Status Information (CSI) indicative of a downlink channel state, for example, a Channel Quality Indicator (CQI), a Precoding Matrix Index (PMI), a Precoding Type Indicator (PTI), and a Rank Indication (RI) can be transmitted on a PUCCH. Periodic CSI may be transmitted through a PUCCH.

A PUSCH is mapped to an Uplink Shared Channel (UL-SCH), that is, a transport channel. Uplink data transmitted on the PUSCH may be a transport block, that is, a data block for the UL-SCH transmitted during a TTI. The transport block may include user data. Or, the uplink data may be multiplexed data. The multiplexed data may be the multiplexing of the transport block for the UL-SCH and CSI. For example, the CSI multiplexed into data may be a CQI, a PMI, or an RI. Or, the uplink data may include only CSI. Periodic or aperiodic CSI may be transmitted through a PUSCH.

In a wireless communication system, UE performs an operation of receiving scheduling information, such as an DL grant and an UL grant, and receiving a PDSCH and sending a PUSCH based on scheduling information through a PDCCH. In general, a DL grant and a PDSCH are received within the same subframe. Furthermore, in the case of FDD, UE sends a PUSCH after 4 subframes from a subframe in which an UL grant has been received. LTE also provides Semi-Persistent Scheduling (SPS) in addition to such dynamic scheduling.

DL or UL SPS may inform UE whether or not semi-persistent transmission (PUSCH)/reception (PDSCH) are performed in what subframes through a higher layer signal, such as Radio Resource Control (RRC). A parameter given as a higher layer signal may be, for example, the period of a subframe and an offset value.

If UE receives the activation or release signal of SPS transmission through a PDCCH after recognizing semi-persistent transmission/reception through RRC signaling, the UE performs or releases the SPS transmission/reception. That is, UE does not immediately perform SPS transmission/reception although SPS is assigned through RRC signaling, but when an activation or release signal is received through a PDCCH, the UE performs SPS transmission/reception in a subframe period assigned through RRC signaling and a subframe corresponding to an offset value by applying frequency resources (i.e., a resource block) according to a resource block designated by the PDCCH, modulation according to MCS information, and a coding rate. If a release signal is received through a PDCCH, UE stops SPS transmission/reception. The UE restarts the stopped SPS transmission/reception using frequency resources designated by a corresponding PDCCH, an MCS, etc. when a PDCCH including an activation signal is received.

A PDCCH for SPS configuration/release may be called an SPS assignment PDCCH, and a PDCCH for common PUSCH/PDSCH may be called a dynamic PDCCH. UE can validate whether or not a PDCCH is an SPS assignment PDCCH if all the following conditions are satisfied. 1. CRC parity bits obtained from PDCCH payload must be scrambled to an SPS C-RNTI, and 2. A value of a new data indicator field must be '0'. Furthermore, if each field value of a PDCCH is set like the field values of the following table in relation to each DCI format, UE considers DCI information for the corresponding PDCCH to be SPS activation or release.

TABLE 4

|  | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 4 shows the field values of an SPS assignment PDCCH for validating SPS activation.

TABLE 5

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Table 5 shows the field values of an SPS assignment PDCCH for validating SPS release.

A carrier aggregation system is described below.

[Carrier Aggregation System]

Figure 5:
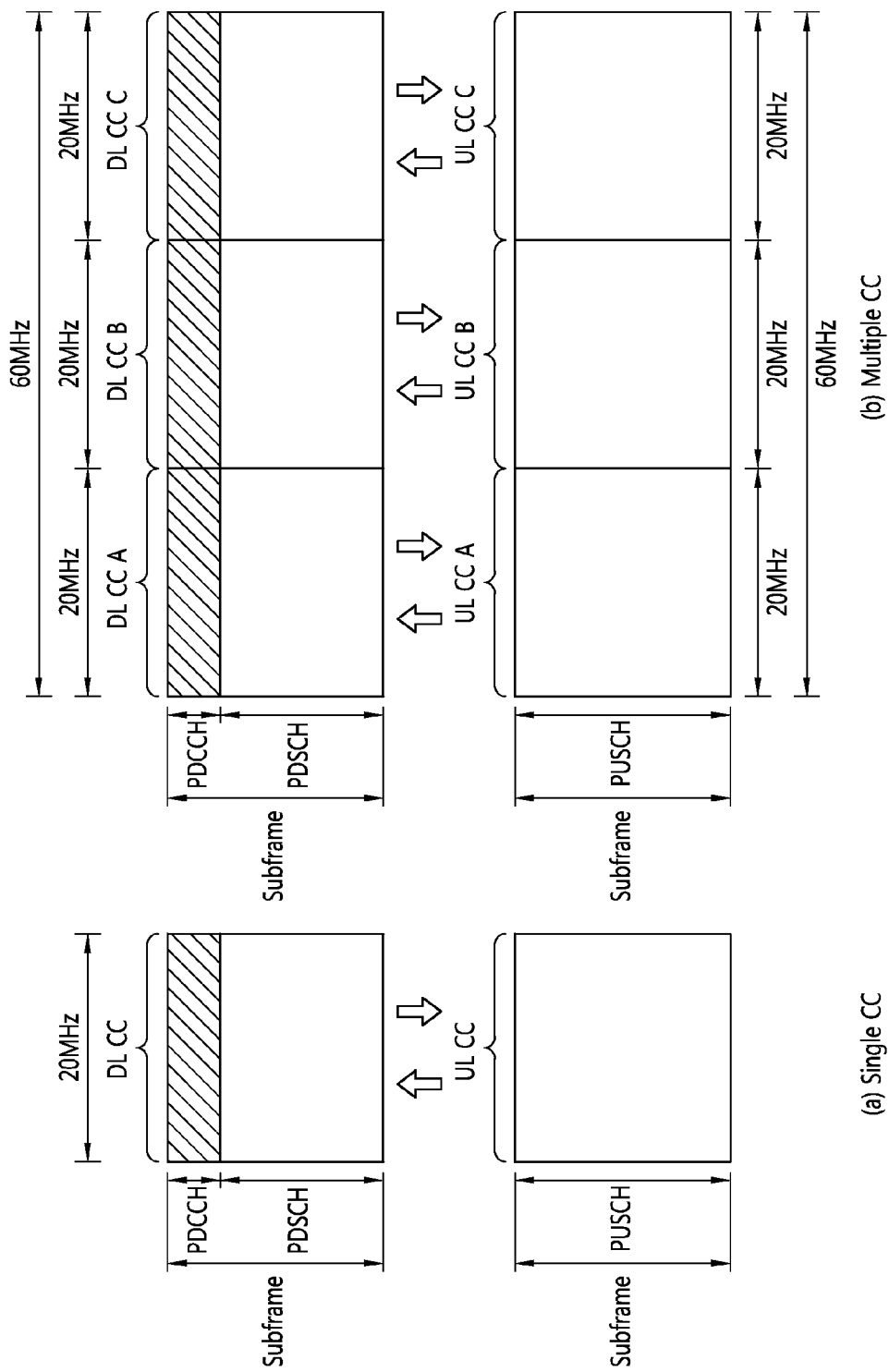
FIG. 5 is an example of a comparison between an existing single carrier system and a carrier aggregation system.

FIG. 5 is an example of a comparison between an existing single carrier system and a carrier aggregation system.

Referring to FIG. 5, in a single carrier system, only one carrier is supported for UE in uplink and downlink. The bandwidth of a carrier may be various, but the number of carriers assigned to UE is one. In contrast, in a Carrier Aggregation (CA) system, a plurality of CCs DL CCs A to C and UL CCs A to C can be assigned to UE. A Component Carrier (CC) means a carrier used in a CA system, and a CC may be abbreviated as a carrier. For example, in order to assign a bandwidth of 60 MHz to UE, 3 CCs each having 20 MHz may be assigned to the UE.

A CA system may be divided into a contiguous CA system in which aggregated carriers are contiguous to each other and a non-contiguous CA system in which aggregated carriers are spaced apart from each other. It is to be understood that a CA system includes both a case where CCs are contiguous to each other and a case where CCs are not contiguous to each other when it is simply said.

A CC, that is, a target when aggregating one or more CCs may use bandwidths used in an existing system for the purpose of backward compatibility with the existing system. For example, a 3GPP LTE system supports bandwidths of 1.4 MHz, 3 MHz, 5 MHz, 10 MHz, 15 MHz, and 20 MHz. A 3GPP LTE-A system can configure a broadband of 20 MHz or higher using only the bandwidths of the 3GPP LTE system. Or, a 3GPP LTE-A system may configure a broadband by defining new bandwidths without using the bandwidths of an existing system.

The system frequency band of a wireless communication system is classified into a plurality of carrier frequencies. Here, the carrier frequency means the center frequency of a cell. Hereinafter, a cell may mean downlink frequency resources and uplink frequency resources. Or, a cell may mean a combination of downlink frequency resources and optional uplink frequency resources. Furthermore, in general, if a CA is not taken into consideration, one cell may always include uplink and downlink frequency resources that form a pair.

In order for packet data to be transmitted and received through a specific cell, UE first has to complete a configuration for the specific cell. Here, the configuration means a state in which the reception of system information necessary to transmit and receive data to and from the specific cell has been completed. For example, the configuration may include an overall process of receiving common physical layer parameters necessary for the transmission/reception of data, Medium Access Control (MAC) layer parameters, or parameters necessary for a specific operation in the RRC layer. A configuration-completed cell is in a state in which the cell can immediately transmit and receive packet data only it has only to receive information about which the packet data can be transmitted.

A cell of a configuration-completed state may be in an activation or deactivation state. Here, the activation refers to a state in which data is being transmitted or received or a state in which data is ready to be transmitted or received. UE can monitor and receive the control channel (PDCCH) and data channel (PDSCH) of an activated cell in order to check resources (they may be the frequency, the time, etc.) assigned thereto.

Deactivation refers to a state in which traffic data cannot be transmitted or received, but measurement or the transmission/reception of minimum information are possible. UE can receive necessary System Information (SI) in order to receive packets from a deactivated cell. In contrast, the UE does not monitor or receive the control channel (PDCCH) and data channel (PDSCH) of a deactivated cell in order to check resources (they may be a frequency, time, etc.) assigned thereto.

A cell may be classified into a primary cell, a secondary cell, and a serving cell.

The primary cell means a cell that operates in a primary frequency, a cell in which UE performs an initial connection establishment procedure or a connection re-establishment procedure with a BS, or a cell that is indicated as a primary cell in a handover process.

The secondary cell means a cell that operates in a secondary frequency. The secondary cell is configured once RRC establishment is set up and used to provide additional radio resources.

The serving cell is formed of a primary cell in the case of UE in which a Carrier Aggregation (CA) has not been configured or to which a CA cannot be provided. If a CA has been configured for UE, the term 'serving cell' indicates a cell configured for UE and may be plural in this case. One serving cell may include one DL CC or a pair of {DL CC, UL CC}. A plurality of serving cells may include a primary cell and one of all secondary cells or a set of a plurality of secondary cells.

A Primary Component Carrier (PCC) means a Component Carrier (CC) corresponding to a primary cell. A PCC is a CC through which UE forms connection or RRC connection with a BS at the early stage from among some CCs. A PCC is a special CC that is responsible for connection or RRC connection for signaling regarding a plurality of CCs and that manages UE context, that is, connection information related to UE. Furthermore, a PCC is always in the activation state when it is in RRC connected mode after forming connection or RRC connection with UE. A DL CC corresponding to a primary cell is called a DL Primary Component Carrier (DL PCC), and an UL CC corresponding to a primary cell is called an UL Primary Component Carrier (UL PCC).

A Secondary Component Carrier (SCC) means a CC corresponding to a secondary cell. That is, an SCC is a CC assigned to UE in addition to a PCC and is a carrier extended for additional resource assignment, etc. by UE in addition to a PCC. An SCC may be divided into the activation or deactivation state. A DL CC corresponding to a secondary cell is called a DL Secondary Component Carrier (DL SCC). An UL CC corresponding to a secondary cell is called an UL Secondary Component Carrier (UL SCC).

A primary cell and a secondary cell have the following characteristics.

First, a primary cell is used to transmit a PUCCH. Second, a primary cell is always activated, whereas a secondary cell is a carrier that is activated or deactivated according to specific conditions. Third, when a primary cell experiences a Radio Link Failure (hereinafter referred to as an RLF), RRC re-establishment is triggered. Fourth, a primary cell may be changed by a change of a security key or by a handover procedure that is accompanied by a random access channel (RACH) procedure. Fifth, Non-Access Stratum (NAS) information is received through a primary cell. Sixth, in the case of an FDD system, a primary cell is always formed of a pair of a DL PCC and an UL PCC. Seventh, a different CC may be configured as a primary cell in each UE. Eighth, a primary cell can be replaced through only a handover process or a cell selection/cell reselection process. In adding a new secondary cell, RRC signaling may be used to transmit system information about a dedicated secondary cell.

In relation to a CC that forms a serving cell, a DL CC may form one serving cell, or a DL CC and an UL CC may form one serving cell through connection establishment. However, a serving cell is not formed of only one UL CC.

The activation/deactivation of a CC has the same concept as the activation/deactivation of a serving cell. For example, assuming that a serving cell is formed of a DL CC1, the activation of the serving cell1 means the activation of the DL CC1. Assuming that a serving cell2 is configured through connection establishment of a DL CC2 and an UL CC2, the activation of the serving cell2 means the activation of the DL CC2 and the UL CC2. In this sense, each CC may correspond to a cell.

The number of CCs that are aggregated between downlink and uplink may be differently set. A case where the number of aggregated DL CCs is the same as the number of aggregated UL CCs is called a symmetric aggregation, and a case where the number of aggregated DL CCs is different from the number of aggregated UL CCs is called an asymmetric aggregation. Furthermore, the CCs may have different sizes (i.e., bandwidths). For example, assuming that 5 CCs are used to form a 70 MHz band, the 70 MHz band may be configured like 5 MHz CC (carrier #0)+20 MHz CC (carrier #1)+20 MHz CC (carrier #2)+20 MHz CC (carrier #3)+5 MHz CC (carrier #4).

As described above, unlike a single carrier system, a CA system can support a plurality of CCs, that is, a plurality of serving cells.

Such a CA system can support cross-carrier scheduling. Cross-carrier scheduling is a scheduling method capable of performing the resource assignment of a PDSCH transmitted through another CC and/or the resource assignment of a PUSCH transmitted through CCs other than CCs that are basically linked to a specific CC, through a PDCCH transmitted through the specific CC. That is, a PDCCH and a PDSCH may be transmitted through different DL CCs, and a PUSCH can be transmitted through another UL CC other than an UL CC that is linked to a DL CC on which a PDCCH including an UL grant has been transmitted. As described above, in a system supporting cross-carrier scheduling, a carrier indicator informing that a PDSCH/PUSCH providing control information are transmitted through what DL CC/UL CC is necessary for a PDCCH. A field including such a carrier indicator is hereinafter called a Carrier Indication Field (CIF).

A CA system supporting cross-carrier scheduling may include a CIF in a conventional Downlink Control Information (DCI) format. In a system supporting cross-carrier scheduling, for example, in an LTE-A system, 3 bits can be extended because a CIF is added to an existing DCI format (i.e., a DCI format used in LTE). In the structure of a PDCCH, an existing coding method and resource assignment method (i.e., resource mapping based on a CCE) may be reused.

Figure 6:
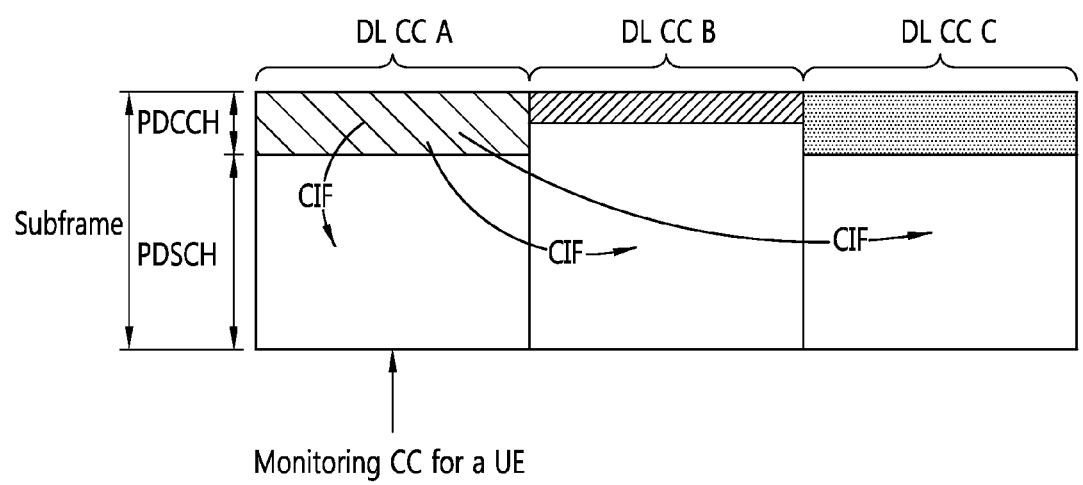
FIG. 6 illustrates cross carrier scheduling in a carrier aggregation system.

FIG. 6 illustrates cross carrier scheduling in a carrier aggregation system.

Referring to FIG. 6, a BS can configure a PDCCH monitoring DL CC set. The PDCCH monitoring DL CC set includes some of all aggregated DL CCs. When cross-carrier scheduling is configured, UE performs PDCCH monitoring/decoding on only DL CCs that are included in a PDCCH monitoring DL CC set. In other words, a BS transmits a PDCCH for a PDSCH/PUSCH to be scheduled through only DL CCs included in the PDCCH monitoring DL CC set. A PDCCH monitoring DL CC set may be configured in a UE-specific, UE group-specific, or cell-specific way. A PDCCH monitoring DL CC may be hereinafter abbreviated as a monitoring cell.

FIG. 6 shows an example in which 3 DL CCs (DL CC A, DL CC B, and DL CC C) are aggregated and the DL CC A has been configured as a PDCCH monitoring DL CC. UE can receive an DL grant for the PDSCH of the DL CC A, the DL CC B, and the DL CC C through the PDCCH of the DL CC A. DCI transmitted through the PDCCH of the DL CC A includes a CIF, and thus it can indicate that the DCI is for what DL CC.

Figure 7:
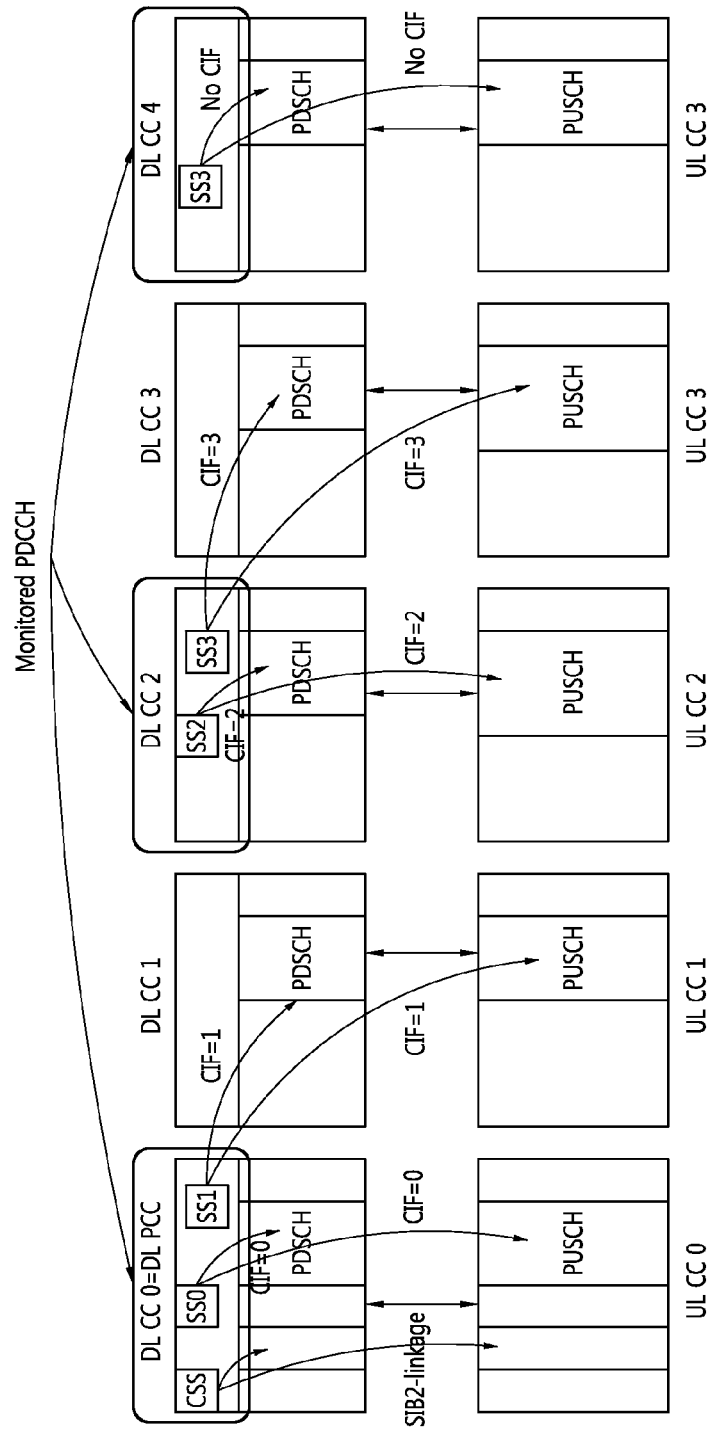
FIG. 7 shows an example of scheduling in the case where cross carrier scheduling has been configured in a carrier aggregation system.

FIG. 7 shows an example of scheduling in the case where cross carrier scheduling has been configured in a carrier aggregation system.

Referring to FIG. 7, a DL CC 0, a DL CC 2, and a DL CC 4 are a PDCCH monitoring DL CC set. UE searches the CSS of the DL CC 0 for a DL grant/UL grant for the DL CC 0 and an UL CC 0 (an UL CC linked to the DL CC 0 through an SIB 2). Furthermore, the UE searches the SS 1 of the DL CC 0 for a DL grant/UL grant for a DL CC 1 and an UL CC 1. The SS 1 is an example of a USS. That is, the SS1 of the DL CC 0 is a search space for searching for a DL grant/UL grant on which cross carrier scheduling is performed.

The present invention is now described. In an improved system after LTE release 10, more pieces of UE can access one BS as compared with an existing system due to techniques, such as Machine Type Communication (MTC) and improved enhanced Multi-User Multi Input Multi Output (MU-MIMO). In such a case, it may be difficult to transfer control information to pieces of a plurality of UE using only a control region within a conventional downlink subframe, that is, only a PDCCH region. That is, a control region may be insufficient. Furthermore, interference in the control region may be problematic because a plurality of RRHs is disposed within a cell.

In order to solve such a problem, in an improved system, to assign additional resources for sending control information by configuring an Enhanced-PDCCH (E-PDCCH) region is being taken into consideration. The E-PDCCH region means a radio resource region to which an E-PDCCH can be assigned, and the E-PDCCH means a control channel in which decoding is performed on control information using a UE-specific reference signal. Unlike a Common Reference Signal (CRS) which is transmitted in the entire DL subframe region and can be received by all pieces of a plurality of UE within a cell, the UE-specific reference signal is transmitted within a data region and used to demodulate a corresponding PDSCH. The UE-specific reference signal is also called a Dedicated Reference Signal (DRS) or demodulation Reference Signal (DM-RS).

FIG. 8 shows an example in which an E-PDCCH region is configured.

Referring to FIG. 8, the E-PDCCH region may be configured in part of a PDSCH region to which PDSCHs, that is, existing data channels, are assigned. In a time domain, Time Division Multiplexing (TDM) can be performed on the E-PDCCH region along with a PDCCH region, and the E-PDCCH region may be placed in the first slot, the second slot, or the two slots of a subframe. Furthermore, in a frequency domain, Frequency Division Multiplexing (FDM) can be performed on the E-PDCCH region along with the PDSCH region. If the E-PDCCH region is assigned to part of an existing PDSCH region as described above, an interference problem in an existing PDCCH region can be solved because frequency selective resources can be assigned. Furthermore, there is an advantage in that an insufficient control region can be extended using only a PDCCH region.

Figure 9:
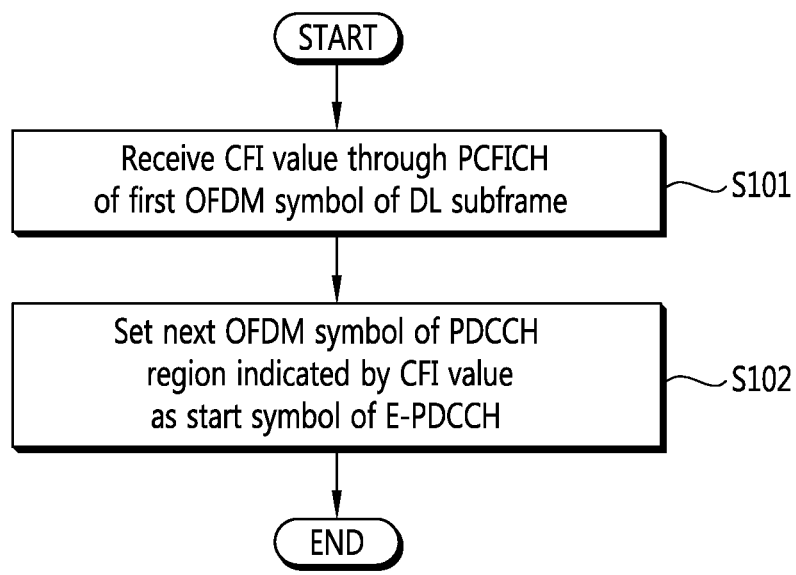
FIG. 9 shows a first example in which the start symbol of an E-PDCCH is configured.

FIG. 9 shows a first example in which the start symbol of an E-PDCCH is configured.

Referring to FIG. 9, UE receives a value of a Control Format Indicator (CFI) through the PCFICH of the first OFDM symbol of a DL subframe (S101).

The UE sets a next OFDM symbol in a PDCCH region, indicated by the CFI value, as the start symbol of an E-PDCCH region (S102). That is, the UE receives a CFI value through an existing PCFICH, checks the size of a PDCCH in a time domain, and sets a next first OFDM symbol of the PDCCH as the start symbol of an E-PDCCH.

In other words, the first example is a method of setting the start symbol of an E-PDCCH using an existing PCFICH (or CFI). In accordance with the first example, there is an advantage in that UE can be aware of the start symbol of an E-PDCCH region even without additional signaling in addition to signaling in an existing LTE system.

In a primary cell Pcell, a CFI can be reliable because DCI is received through the CSS of a PDCCH in order to receive system information and receive paging information. Accordingly, the first example is suitable for a method of recognizing an E-PDCCH region configured in a primary cell Pcell.

Or, in a primary cell Pcell, if there is a subframe not a subframe in which the CSS of an E-PDCCH region has been designated to be searched for, the first example may be used as a method of recognizing the E-PDCCH region configured in the subframe in which the CSS of an E-PDCCH region has been designated to be searched for.

Figure 10:
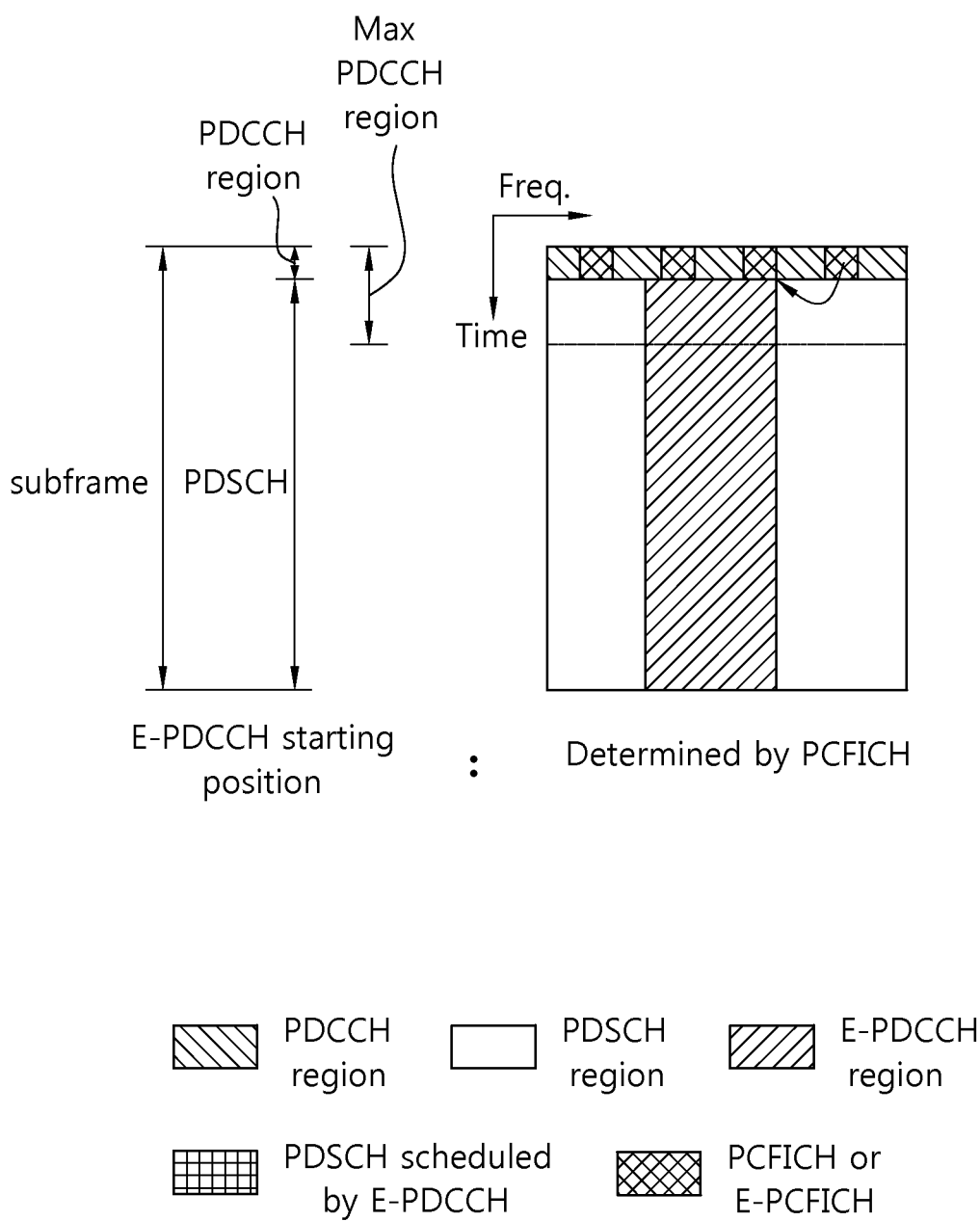
FIG. 10 shows an example of the configuration of a DL subframe in accordance with the first example.

FIG. 10 shows an example of the configuration of a DL subframe in accordance with the first example.

Referring to FIG. 10, a PCFICH is transmitted through predetermined and fixed resources in the first OFDM symbol of a DL subframe. UE receives a CFI value through the PCFICH and receives an E-PDCCH from a next OFDM symbol in a PDCCH region, indicated by the CFI value, to the last OFDM symbol of the DL subframe.

Figure 11:
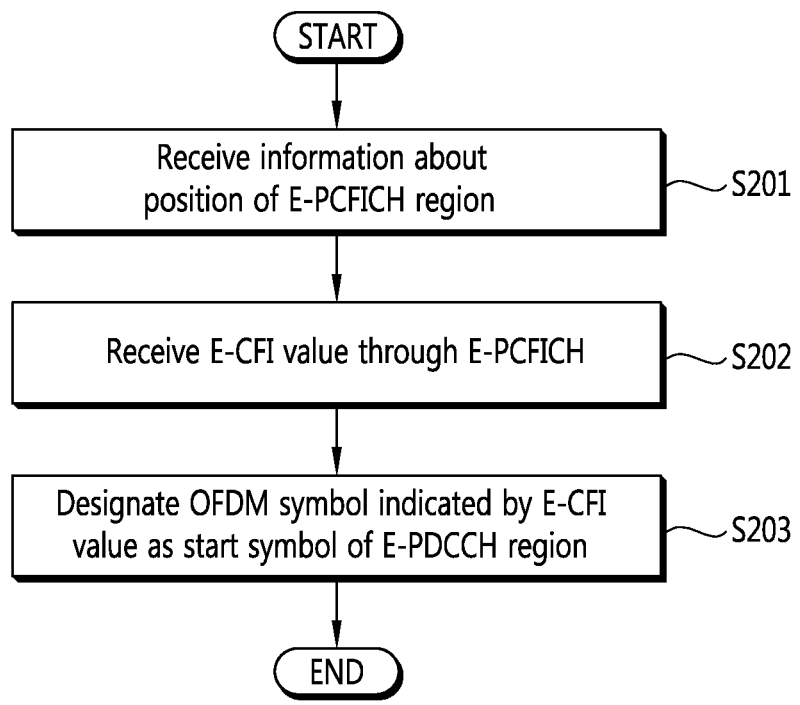
FIG. 11 shows a second example in which the start symbol of an E-PDCCH is configured.

FIG. 11 shows a second example in which the start symbol of an E-PDCCH is configured.

Referring to FIG. 11, UE receives information about the position of an E-PCFICH region (S201). The information about the position of the E-PCFICH region may be information indicative of the start symbol of radio resources through which an E-PCFICH is transmitted in a time domain and of a frequency band. The UE can receive the information about the position of the E-PCFICH region through RRC signaling or broadcasted system information.

The E-PCFICH region may be configured in an OFDM symbol after a maximum of OFDM symbols to which a PDCCH can be assigned. In the case of heterogeneous networks, it is preferred that an E-PCFICH region is configured not to overlap with a PDCCH region because the E-PCFICH region may experience severe interference with the PDCCH region from neighboring cells. To this end, the E-PCFICH region may be configured within a PDSCH region (more particularly, an OFDM symbol after a maximum of OFDM symbols to which a PDCCH can be assigned). If the E-PCFICH region is predetermined, the signaling of a BS regarding information about the position of the E-PCFICH region may be unnecessary.

The UE receives an Enhanced-Control Format Indicator (E-CFI) through the E-PCFICH (S202). The E-CFI may be information that informs the UE of the start symbol of the E-PDCCH. For example, the E-CFI may directly inform a symbol index regarding that the E-PDCCH is started from what place in the OFDM symbols of a DL subframe. Or, several candidates for the start symbol of an E-PDCCH and the size of the E-PDCCH in a time domain may be defined, and which one of the candidates will be actually used may be informed through an index. Or, if the start position of an E-PDCCH is dependent on a PDCCH, the size of the PDCCH in a time domain may be informed.

The E-CFI may have a value independent from a CFI value. For example, in a situation in which a cell #1 and a cell #2 using the same frequency band neighbor each other and the cell #2 gives interference to the cell #1, if a CFI value has 2 in relation to the PDCCH region of the cell #1 and the CFI value has 3 in relation to the PDCCH region of the cell #2, an E-CFI value may have 4 in relation to the E-PDCCH region of the cell #1. That is, an E-CFI value for the E-PDCCH region of a cell that is subject to interference may be set by considering the PDCCH region of a neighboring cell that generates interference. In accordance with the second example, unlike in the first example, a PDCCH region and an E-PDCCH region may not neighbor each other in time in the same DL subframe.

Or, the E-CFI value may have the same value as a CFI value. Since a CFI indicates the region of OFDM symbols occupied by a PDCCH, an E-CFI is also made to indicate the region of OFDM symbols occupied by an PDCCH so that a value of an E-CFI+1 indicates the start point of an E-PDCCH. Here, an E-PCFICH and a PCFICH may be subject to joint encoding/decoding for effective decoding. That is, an E-CFI and a CFI may be subject to joint encoding so that the E-PCFICH and the PCFICH are transmitted through the same radio resources. Whether or not the E-CFI is identical with the CFI may be previously set through RRC signaling.

A BS may send an E-CFI by adding a CRC to the E-CFI in an E-PCFICH, unlike in an existing PCFICH. It is difficult to check the occurrence of an error in a conventional PCFICH because a CFI is transmitted without adding a CRC to the CFI. In accordance with the present invention, UE can detect whether or not an error of an E-CIF value is present through a CRC.

Furthermore, a BS can apply rate matching or puncturing to a PDSCH assigned to include a resource element in which an E-PCFICH is transmitted. Rate matching is a method of setting the transfer rate by loading a signal onto the remaining resource elements without loading the signal onto a specific resource element from the beginning, and puncturing is to first load a signal onto all resource elements including a specific resource element and to puncture the specific resource element. Rate matching may be used in the case of a PDSCH assigned to improved UE capable of recognizing an E-PCFICH, and puncturing may be used in the case of a PDSCH assigned to existing UE not capable of recognizing an E-PCFICH.

The UE sets an OFDM symbol, indicated by the E-CFI value, as the start symbol of the E-PDCCH region (S203). That is, the second example is an example in which the start symbol of an E-PDCCH is set through a new control channel, that is, an E-PCFICH (or an E-CFI).

Figure 12:
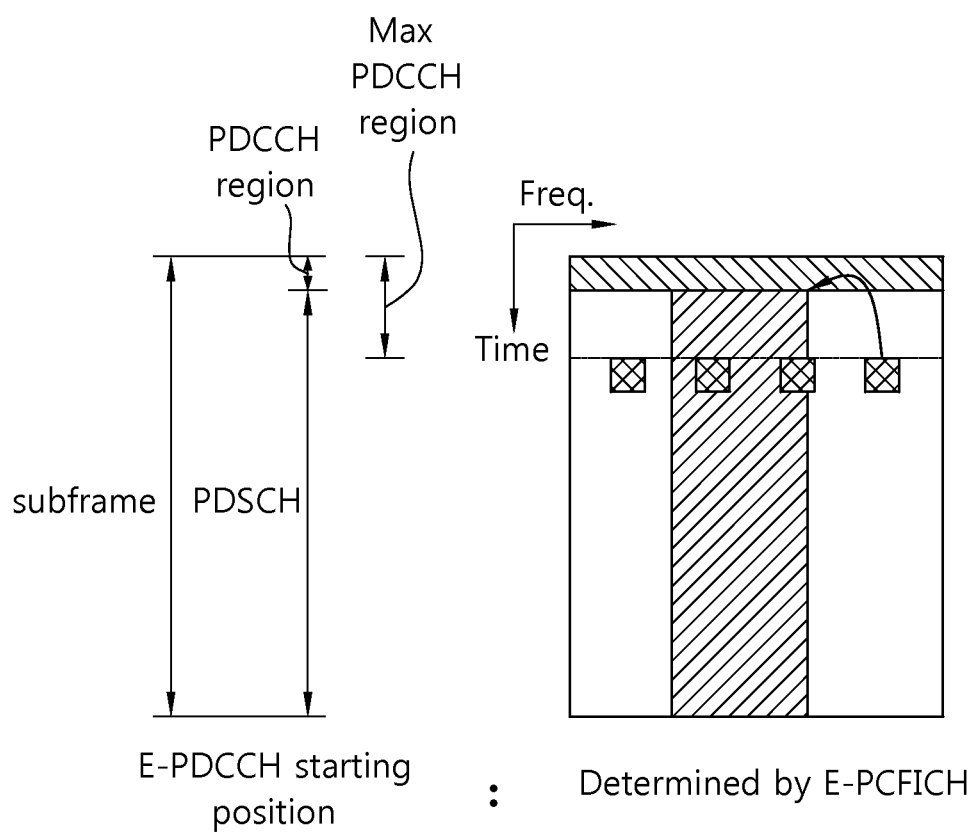
FIG. 12 shows an example of the configuration of a DL subframe in accordance with the second example.

FIG. 12 shows an example of the configuration of a DL subframe in accordance with the second example.

Referring to FIG. 12, an E-PCFICH region configured through RRC signaling, etc. may be placed in an OFDM symbol after a maximum of OFDM symbols (e.g., 4 OFDM symbols) in which a PDCCH can be transmitted. UE can check the start symbol of an E-PDCCH by receiving an E-CFI through an E-PCFICH.

Figure 13:
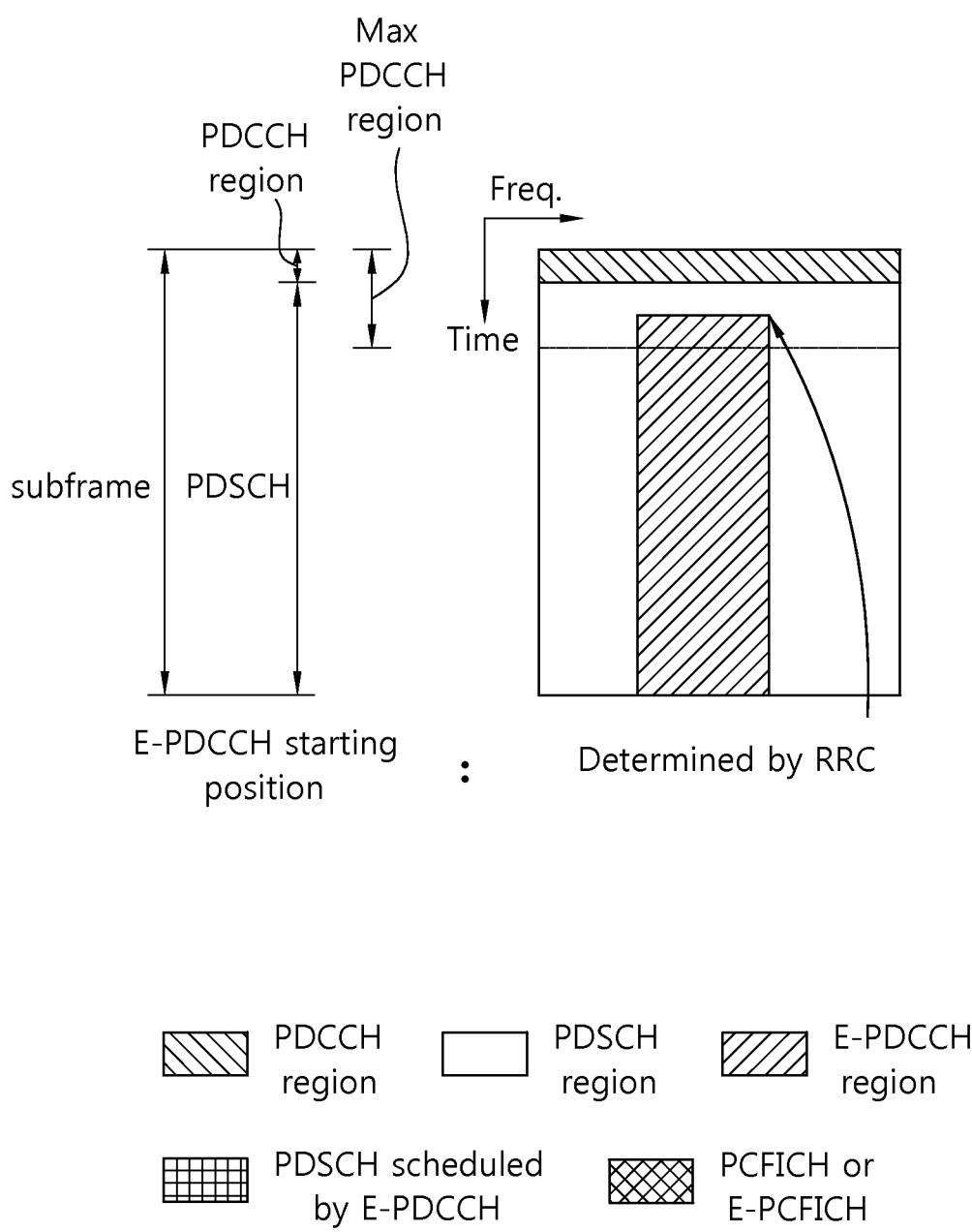
FIG. 13 shows a third example in which the start symbol of an E-PDCCH is configured.

FIG. 13 shows a third example in which the start symbol of an E-PDCCH is configured.

The second example is advantageous in that the start position of an E-PDCCH can be dynamically set by including an E-PCFICH in each DL subframe, but is disadvantageous in that resources for the E-PCFICH are necessary and the E-PCFICH needs to be decoded.

In order to solve the problems, a BS may inform the start position of an E-PDCCH semi-persistently through an RRC message. For example, the RRC message may include information, such as an OFDM symbol at which an E-PDCCH is started within a DL subframe, the interval of DL subframes in which the E-PDCCH is present, and a carrier index. The start position of an E-PDCCH may not be dynamically informed because a higher layer signal, such as an RRC message, is used, but there is an advantage in that an error of decoding can be reduced because an E-PCFICH does not need to be decoded in each DL subframe in order to know the start position of an E-PDCCH.

If a carrier aggregation is applied to UE and an E-PDCCH is placed in a secondary cell, the start position of an E-PDCCH may have the same value as the start position of a PDSCH that is set through RRC in relation to a secondary cell subject to cross carrier scheduling in an existing LTE-A system or may have an independent value.

First, a case where the same value is used is described. In existing LTE-A, in the case of non-cross carrier scheduling, all cells set the start position of a PDSCH using a PCFICH transmitted in each cell. In contrast, in the case of cross carrier scheduling, a monitoring cell sets the start position of a PDSCH using a PCFICH, but the remaining cells set the start positions of PDSCHs through RRC messages. The start position of an E-PDCCH in each of cells other than a monitoring cell can be set to be the same as the start position of a PDSCH using such a conventional method. Accordingly, the start position of the E-PDCCH can also be set by setting the start position of the PDSCH through an RRC message. That is, in cells other than a monitoring cell, the start position of an E-PDCCH can be set to be the same as the start position of a PDSCH set through an RRC message.

Meanwhile, if an E-PDCCH is placed in a secondary cell, the start position of the E-PDCCH may be set based on information about the start position of the E-PDCCH (start position information) which is additionally transmitted through an RRC message independently from the start position of a PDSCH of the secondary cell.

That is, a third example illustrates a method of semi-persistently or persistently the start position of an E-PDCCH through a higher layer signal, such as an RRC message.

Unlike in a primary cell Pcell, in a secondary cell Scell, there may be a case where a CFI is not reliable because DCI is not received through the CSS of a PDCCH. Accordingly, the third example is suitable for a method of recognizing an E-PDCCH region configured in a secondary cell Scell.

Or, if there is a subframe not a subframe in which the CSS of a PDCCH region has been designated to be searched for in a primary cell Pcell, the third example may be used as a method of recognizing an E-PDCCH region configured in a subframe in which a CSS has been designated not to be searched for.

Figure 14:
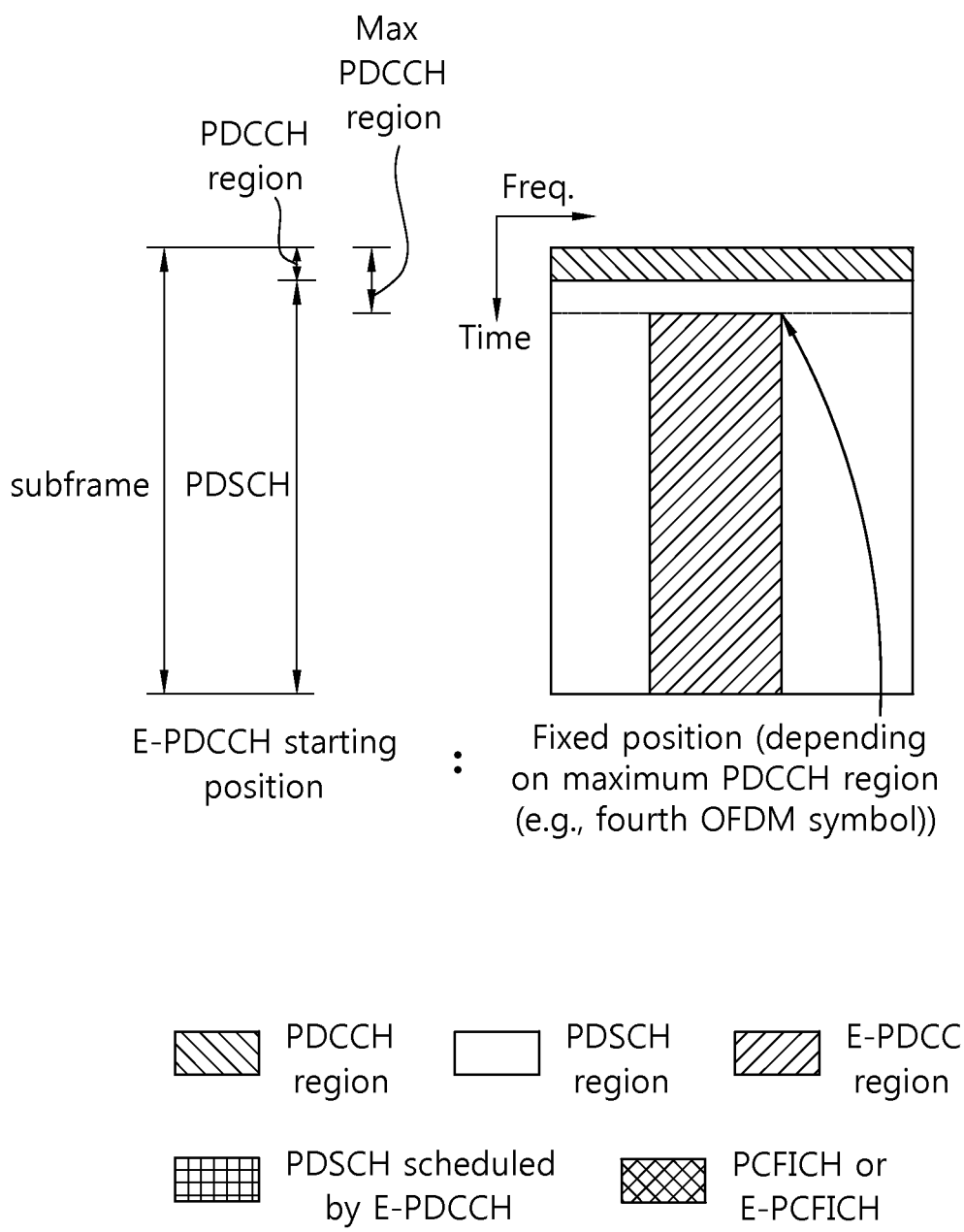
FIG. 14 shows a fourth example in which the start symbol of an E-PDCCH is configured.

FIG. 14 shows a fourth example in which the start symbol of an E-PDCCH is configured.

The start position of an E-PDCCH may be previously determined to be always started from an OFDM symbol after a maximum of OFDM symbols by considering a maximum number of OFDM symbols to which a PDCCH can be assigned. For example, if a maximum number of OFDM symbols over which a PDCCH region can span is 3, an E-PDCCH region is previously determined to always start from a fourth OFDM symbol. Such a method is disadvantageous in that a loss may be generated in utilizing the resources of an E-PDCCH, but is advantageous in that this method can operate without an E-PCFICH and additional signaling, such as an RRC message.

In particular, in a Multicast Broadcast Single Frequency Network (MBSFN) subframe, unlike in other common subframes, a CRS is transmitted only in up to a second OFDM symbol, but is not transmitted in subsequent OFDM symbols. If transmission mode 9 driven in response to a UE-specific reference signal (or UE-specific DM RS) is applied in a subframe configured as an MBSFN subframe, a PDCCH is transmitted in a maximum of first 2 OFDM symbols in the MBSFN subframe. Here, a physical structure may be changed, for example, in a Cyclic Prefix (CP) configuration for the first 2 OFDM symbols and a CP configuration for subsequent OFDM symbols. Accordingly, if the fourth example is applied, an E-PDCCH may be configured to be always started from a third OFDM symbol. Furthermore, in the case of a New Carrier Type (NCT) in which a PDCCH region is not configured, the start point of an E-PDCCH can be set from the first OFDM symbol.

The first example to the fourth example regarding the configuration of the start symbol of an E-PDCCH have been described above.

The first example and the second example are methods of dynamically setting the start position of an E-PDCCH, and the third example and the fourth example are methods of setting the start position of an E-PDCCH semi-persistently or persistently. The examples may be individually used and may be combined and used. That is, in channel conditions in which a PCFICH or an E-PCFICH is suitable to be detected, a method of dynamically setting the start position of an E-PDCCH may be used. In channel conditions in which a PCFICH or an E-PCFICH is not suitable to be detected, a method of setting the start position of an E-PDCCH semi-persistently or persistently may be combined and used.

Meanwhile, a method of setting the start position of an E-PDCCH may be differently applied depending on whether a CSS is configured in the E-PDCCH or a USS is configured in the E-PDCCH. That is, if a CSS is configured in an E-PDCCH, a method of setting the start symbol of the E-PDCCH may be different from a case where a USS is configured in an E-PDCCH. This is because a CSS configured in an E-PDCCH is used by all pieces of a plurality of UE or pieces of a plurality of UE that belong to a specific group and thus to set the start symbol of the E-PDCCH through an RRC message so that a method of setting the start symbol of the E-PDCCH is changed in each UE is not preferred. Accordingly, if a USS is configured in an E-PDCCH region, the first to the third examples preferably are used as a method of setting the start symbol of an E-PDCCH. If a CSS is configured in an E-PDCCH region, the fourth example preferably is used as a method of setting the start symbol of an E-PDCCH.

Furthermore, a method of setting the start position of an E-PDCCH may be differently applied in a cell in which the E-PDCCH is placed depending on whether or not a search space is configured in a PDCCH region for UE. That is, if a Search Space (SS) in which a PDCCH is searched for is configured in a PDCCH region, a CFI may be considered to be reliable because the PDCCH region is detected through the CFI. Accordingly, if a search space is configured in a PDCCH region, the first to the third examples preferably are used as a method of setting the start symbol of an E-PDCCH. If a search space is not configured in a PDCCH region, the fourth example preferably is used as a method of setting the start symbol of an E-PDCCH.

A method of configuring the start position of a PDSCH scheduled through an E-PDCCH is described below.

FIG. 15 shows an example of a method of setting the start position of a PDSCH scheduled through an E-PDCCH.

Referring to FIG. 15, a PDSCH scheduled through an E-PDCCH may be configured to have the same start position as the E-PDCCH.

More particularly, in the case of non-cross carrier scheduling, a PDSCH scheduled through an E-PDCCH has the same start position as an E-PDCCH within the same cell. Accordingly, if the start position of an E-PDCCH is different in each cell, the start position of a PDSCH can be changed.

In the case of cross carrier scheduling, that is, if a cell in which a scheduling E-PDCCH is different from a cell in which a scheduled PDSCH is placed, the PDSCH may follow the start position of an E-PDCCH placed in the same cell.

For example, it is assumed that an E-PDCCH #1 161 has been assigned in a first cell and an E-PDCCH #2 162 and a PDSCH #2 163 have been assigned in a second cell. If the E-PDCCH #1 161 schedules the PDSCH #2 163, this is cross carrier scheduling. Here, the start position of the PDSCH #2 163 follows the start position of the E-PDCCH #2 162.

Accordingly, the start position of the PDSCH #2 163 is determined by a PCFICH if a method of setting the start position of the E-PDCCH #2 162 is the first example, by an E-PCFICH if a method of setting the start position of the E-PDCCH #2 162 is the second example, by a value set through RRC if a method of setting the start position of the E-PDCCH #2 162 is the third example, and by a maximum number of OFDM symbols of a PDCCH if a method of setting the start position of the E-PDCCH #2 162 is the fourth example.

FIG. 16 shows another example of a method of setting the start position of a PDSCH scheduled through an E-PDCCH.

Referring to FIG. 16, in the case of non-cross carrier scheduling, a PDSCH is started from an OFDM symbol right after a PDCCH region in a corresponding cell. If a PDCCH region is not present in a corresponding cell, a PDSCH is started from the first OFDM symbol of a DL subframe.

In the case of cross carrier scheduling, that is, if a cell in which a scheduling E-PDCCH is placed is different from a cell in which a scheduled PDSCH is placed, the PDSCH may follow the start position of an E-PDCCH that is placed in the same cell.

For example, it is assumed that an E-PDCCH #1 171 has been assigned in a first cell and a PDCCH #2 174, an E-PDCCH #2 172, and a PDSCH #2 173 have been assigned in a second cell. If the E-PDCCH #1 171 schedules the PDSCH #2 173, this is cross carrier scheduling. Here, the PDSCH #2 173 is started from an OFDM symbol right after the PDCCH #2 174 placed in the same cell.

In accordance with the method described with reference to FIG. 15, there may be an OFDM symbol that is not used as a PDSCH although the start position of an E-PDCCH is placed outside an PDCCH region (e.g., in the third and the fourth examples). An OFDM symbol right after the PDCCH region is used as a PDSCH region because resources are wasted.

In order to support such a method, a symbol at which the PDSCH #2 173 is started may be indicated by a PCFICH or an E-PCFICH within the PDCCH #2 (174) region.

Or, information about the start position of the PDSCH #2 173 may be included in the DCI of the E-PDCCH #1 171 that schedules the PDSCH #2 173 and signaled. In such a method, the start position of a PDSCH preferably is signaled by an OFDM symbol right after the PDCCH region, but may be freely set according to system conditions.

The method described with reference to FIG. 15 and the method described with reference to FIG. 16 may be mixed. In such a case, a BS may previously set which one of the methods will be used through an RRC message.

For example, a BS may configure the method described with reference to FIG. 15 to be used through an RRC message if a method of dynamically setting the start position of an E-PDCCH, that is, the first example or the second example, is used and configure the method described with reference to FIG. 16 to be used through an RRC message if a method of setting the start position of an E-PDCCH semi-persistently or dynamically, that is, the third example or the fourth example, is used.

Yet another example of a method of setting the start position of a PDSCH scheduled through an E-PDCCH is described.

The start position of a PDSCH scheduled through an E-PDCCH can be signaled through RRC independently from the E-PDCCH that schedules the PDSCH. For example, it is assumed that an E-PDCCH #1 has been assigned in a first cell and a PDSCH #2 173 has been assigned in a second cell. If the E-PDCCH #1 schedules the PDSCH #2, this is cross carrier scheduling. Here, the start position of the PDSCH #2 is determined based on position information that is received through an RRC message independently from the E-PDCCH #1. In accordance with such a method, interference from a neighboring cell that uses the same frequency in heterogeneous network situations can be reduced by variably controlling the start position of an E-PDCCH or a PDSCH, and this method is useful in a secondary cell in addition to a primary cell or a New Carrier Type (NCT).

Meanwhile, the start position of an E-PDCCH may be differently applied in a cell in which UE attempts to detect a PDCCH and in a cell in which UE does not attempt to detect a PDCCH. A cell that attempts to detect a PDCCH may be, for example, a monitoring cell upon cross carrier scheduling and all cells upon non-cross carrier scheduling. A cell that does not attempt to detect a PDCCH is a cell not including a PDCCH search space and may be, for example, cells other than a monitoring cell, an NCT, etc. upon cross carrier scheduling.

A BS may apply the first example to a cell in which UE attempts to detect a PDCCH and apply the third and the fourth examples to a cell in which UE does not attempt to detect a PDCCH.

Furthermore, the BS inform whether or not the start position of an E-PDCCH in a secondary cell will be derived based on a PCFICH through a higher layer signal, such as an RRC message.

Furthermore, the start position of an E-PDCCH in a cell not including a PDCCH region or the start position of a PDSCH scheduled through an E-PDCCH may be set from the first OFDM symbol of a subframe.

Figure 17:
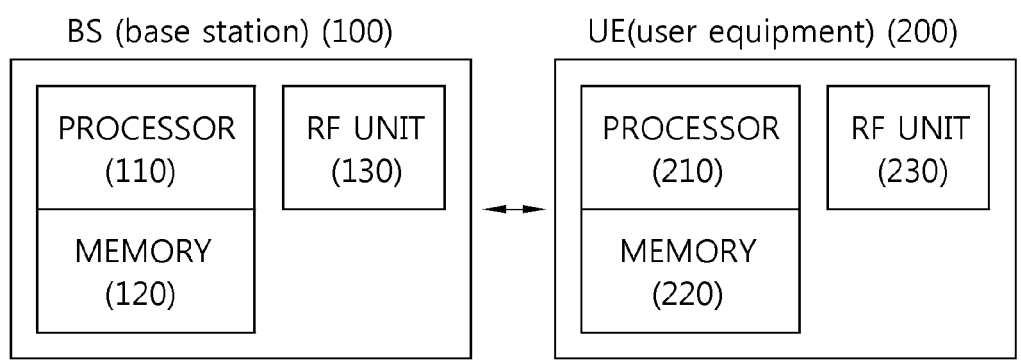
FIG. 17 shows the construction of a BS and UE in accordance with an embodiment of the present invention.

FIG. 17 shows the construction of a BS and UE in accordance with an embodiment of the present invention.

The BS 100 includes a processor 110, memory 120, and a Radio Frequency (RF) unit 130. The processor 110 implements the proposed functions, processes, and/or methods. For example, the processor 110 informs UE of the start position of an E-PDCCH. Detailed methods have been described in connection with the first example to the fourth example with reference to FIGS. 9 to 14. Furthermore, the processor 110 sends data to UE through a PDSCH scheduled by an E-PDCCH. The start position of the PDSCH scheduled by the E-PDCCH is set dependently on or independently from the start position of the E-PDCCH, which has been described with reference to FIGS. 15 to 16. The memory 120 is coupled to the processor 110, and it stores various pieces of information for driving the processor 110. The RF unit 130 is coupled to the processor 110, and it sends and/receives radio signals.

UE 200 includes a processor 210, memory 220, and an RF unit 230. The processor 210 implements the proposed functions, processes, and/or methods. For example, the processor 210 receives information about the start position of an E-PDCCH dynamically or semi-persistently through signaling. Furthermore, the processor 210 demodulates an E-PDCCH, receives information about the scheduling of a PDSCH scheduled by the E-PDCCH, and receives/demodulates the corresponding PDSCH. Here, the start position of the PDSCH may be determined dependently on or independently from the start position of the E-PDCCH. The memory 220 is coupled to the processor 210, and it stores various pieces of information for driving the processor 210. The RF unit 230 is coupled to the processor 210, and it sends and/receives radio signals.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

Although the some embodiments of the present invention have been described above, a person having ordinary skill in the art will appreciate that the present invention may be modified and changed in various ways without departing from the technical spirit and scope of the present invention. Accordingly, the present invention is not limited to the embodiments and it may be said that the present invention includes all embodiments within the scope of the claims below.

What is claimed is:

1. A method for configuring a starting position of channel, performed by a User Equipment, UE, in a time domain in a wireless communication system, the method comprising:
    upon receiving position information informing of a starting position of an Enhanced Physical Downlink Control CHannel, EPDCCH, through a Radio Resource Control, RRC, message, determining, by the UE, a starting Orthogonal Frequency Division Multiplexing, OFDM, symbol of the EPDCCH based on the position information,
    wherein if a Physical Downlink Shared Channel, PDSCH, is determined to have been assigned by the EPDCCH in a same serving cell, a starting OFDM symbol for the PDSCH corresponds to the starting OFDM symbol of the EPDCCH indicated by the received position information; and
    when no position information informing of a starting position of the EPDCCH is received through RRC messaging, recognizing, by the UE, as the start point of the EPDCCH an OFDM symbol next to a Physical Downlink Control Channel, PDCCH, region checked through a Physical Control Format Indicator Channel, PCFICH.

2. The method of claim 1, wherein the position information indicates an OFDM symbol in a subframe comprising a plurality of OFDM symbols.

3. The method of claim 1, wherein the EPDCCH is demodulated by a Demodulation Reference Signal, DM RS.

4. The method of claim 1, wherein if the PDSCH is assigned by the EPDCCH in a different serving cell, the starting OFDM symbol for the PDSCH is set by information other than the received position information.

5. A User Equipment UE, the UE comprising:
a Radio Frequency, RF, unit configured to transmit and receive radio signals; and
a processor connected to the RF unit, wherein the processor is configured to:
upon receiving position information informing of a starting position of an Enhanced Physical Downlink Control CHannel, EPDCCH, through a Radio Resource Control, RRC, message, t-e-determine a starting Orthogonal Frequency Division Multiplexing, OFDM, symbol of the EPDCCH based on the position information,
wherein if a Physical Downlink Shared Channel, PDSCH, is determined to have been assigned by the EPDCCH in a same serving cell, a starting OFDM symbol for the PDSCH corresponds to the starting OFDM symbol of the EPDCCH indicated by the received position information; and
when no position information informing of a starting position of the EPDCCH is received through RRC messaging, to recognize as the start point of an EPDCCH an OFDM symbol next to a Physical Downlink Control Channel, PDCCH, region checked through a Physical Control Format Indicator Channel, PCFICH.

6. The UE of claim 5, wherein the position information indicates an OFDM symbol in a subframe comprising a plurality of OFDM symbols.

7. The UE of claim 5, wherein the EPDCCH is demodulated by a Demodulation Reference Signal, DM RS.

8. The UE of claim 5, wherein if the PDSCH is assigned by the EPDCCH in a different serving cell, the starting OFDM symbol for the PDSCH is set by information other than the received position information.

* * * * *